United States Patent
Ono

(10) Patent No.: US 9,785,004 B2
(45) Date of Patent: Oct. 10, 2017

(54) LIQUID CRYSTAL DISPLAY DEVICE AND METHOD OF MANUFACTURING LIQUID CRYSTAL DISPLAY DEVICE

(71) Applicant: Panasonic Liquid Crystal Display Co., Ltd., Hyogo (JP)

(72) Inventor: Kikuo Ono, Ibaraki (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 14/744,704

(22) Filed: Jun. 19, 2015

(65) Prior Publication Data

US 2016/0370676 A1 Dec. 22, 2016

(51) Int. Cl.
*G02F 1/1333* (2006.01)
*G02F 1/1343* (2006.01)

(52) U.S. Cl.
CPC .... *G02F 1/13338* (2013.01); *G02F 1/134363* (2013.01)

(58) Field of Classification Search
CPC ........... G02F 1/134363; G02F 1/13338; G06F 3/0412
See application file for complete search history.

(56) References Cited

U.S. PATENT DOCUMENTS

| 2009/0079921 A1* | 3/2009 | Mori ................. G02F 1/133555 349/114 |
| 2009/0185088 A1* | 7/2009 | Shinohara ............ G06F 3/0412 349/12 |
| 2010/0194697 A1* | 8/2010 | Hotelling .............. G06F 3/0412 345/173 |
| 2012/0327346 A1* | 12/2012 | Tsai .................. G02F 1/134363 349/138 |
| 2013/0300953 A1 | 11/2013 | Hotelling et al. |

* cited by examiner

*Primary Examiner* — Jessica M Merlin
(74) *Attorney, Agent, or Firm* — Wenderoth, Lind & Ponack, L.L.P.

(57) ABSTRACT

A liquid crystal display device includes a plurality of pixel regions divided into a plurality of areas. The plurality of areas include a plurality of first areas and a plurality of second areas. In each of the pixel regions in each of the first areas, one of (i) the pixel electrode and (ii) the common electrode is formed closer to the liquid crystal layer than the other of (i) the pixel electrode and (ii) the common electrode. In each of the pixel regions in each of the second areas, the other of (i) the pixel electrode and (ii) the common electrode is formed closer to the liquid crystal layer than the one of (i) the pixel electrode and (ii) the common electrode. The common electrode in each of the first areas is formed in a same layer as the pixel electrode in each of the second areas.

11 Claims, 20 Drawing Sheets

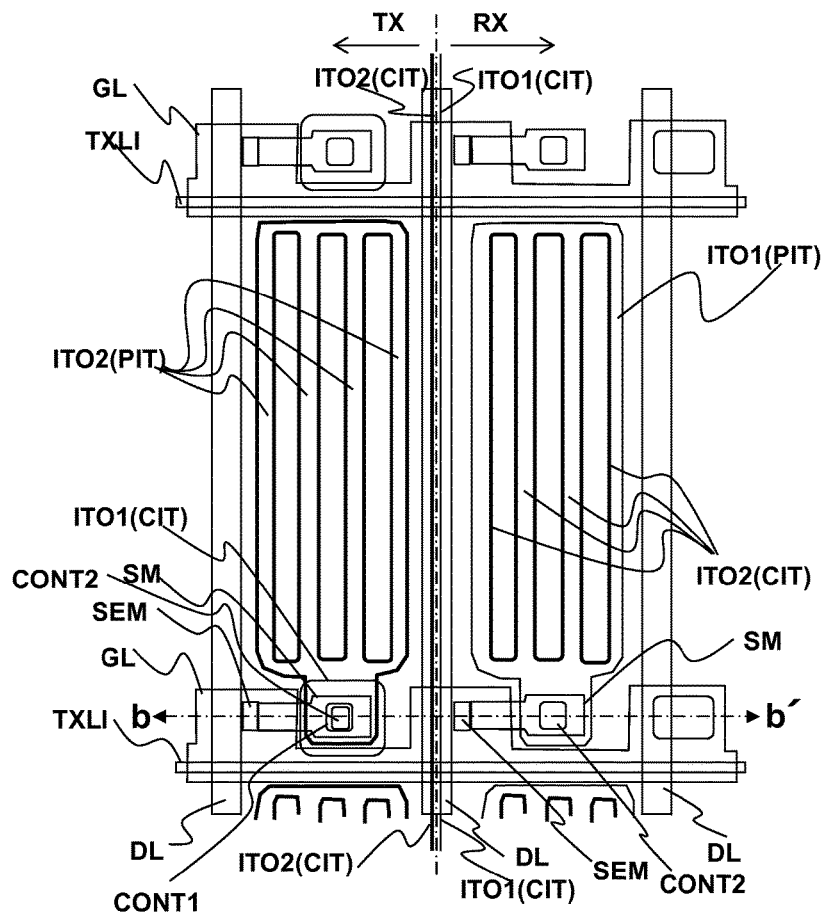
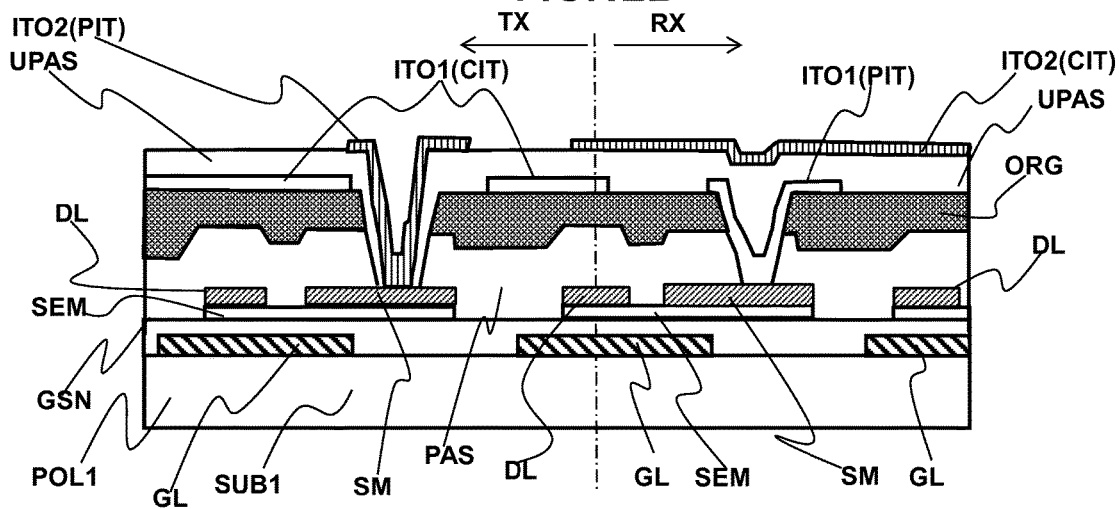

LIQUID CRYSTAL DISPLAY DEVICE AND METHOD OF MANUFACTURING LIQUID CRYSTAL DISPLAY DEVICE

TECHNICAL FIELD

The present disclosure relates to a liquid crystal display device of IPS (In Plane Switching) mode and a method of manufacturing the liquid crystal display device.

BACKGROUND

A liquid crystal display device of IPS mode is constituted such that a pair of transparent substrates are arranged to face each other in an opposed manner with a liquid crystal layer being disposed therebetween, and pixel electrodes and counter electrodes, which generate an electric field (lateral electric field) parallel to the transparent substrate between the counter electrode and the pixel electrode, are formed on each pixel region on a liquid-crystal side of one of such transparent substrates. Such a liquid crystal display device is a known display device having broad viewing angle characteristics, whose display is not changed even when viewed from a direction oblique to a display surface. Heretofore, in the liquid crystal display device IPS mode, the counter electrodes are formed on the whole pixel region, except for the periphery of the pixel region.

Recently, a tablet-type information terminal and a multi-functional mobile phone (so-called smartphone) including a touch screen have become popular. There has been proposed a touch screen in which the image display device and the contact-detection type input device are not separately formed but integrally formed. Such a touch screen is referred to as, for example, "embedded type" or "in-cell type". In this case, a plurality of common electrodes for display are segmented into a plurality of touch driving regions and touch detecting (sensing) regions, thereby allowing a mutual capacitance to be generated between the touch driving region and the touch detecting region. Therefore, the display device measures the change of a mutual capacitance that occurs due to a touch, and thus determines whether a touch has occurred.

When various functions are added to the liquid crystal display device of IPS-mode, it is necessary to apply not only a common electric potential for a display but also a plurality of types of other kinds of signals to the common electrodes formed in the same layer at the same time. In this case, it is necessary to detour around wirings so that common electrodes to which different signals are applied do not short-circuit each other. For example, in the case of a liquid crystal display with a touch panel system inside, common electrodes are divided into plural touch regions. Each touch region performs a function of a touch driving electrode or a touch detecting electrode. Then it may be necessary to connect common electrodes having the same function with each other and to prevent two kinds of common electrodes with different functions from short-circuiting each other. This leads to complicated wirings, a decrease in a pixel aperture ratio and an increase in the steps of a manufacturing process.

Hence, one or more embodiments of the present application have an object to provide a liquid crystal display device of IPS-mode manufactured by a simple manufacturing process with an enhanced pixel aperture ratio.

SUMMARY

Accordingly, the present disclosure is directed to provide a liquid crystal display with a touch panel system inside having an enhanced pixel aperture ratio manufactured by a simple processes.

In a general aspect, a liquid crystal display device includes a first substrate, a second substrate, a liquid crystal layer sandwiched between the first substrate and the second substrate, and a display portion formed on the first substrate. The display portion includes a plurality of data lines extending in a first direction, a plurality of gate lines extending in a second direction which is different from the first direction and a plurality of pixel regions formed in a matrix. Each of the pixel regions is surrounded by the data lines and the gate lines. Each of the plurality of pixel regions includes a thin film transistor connected to the data line, a pixel electrode connected to the thin film transistor and a common electrode that is opposed to the pixel electrode. The plurality of pixel regions in the display portion are divided into a plurality of areas, each of the plurality of areas including at least two pixel regions arranged adjacent to each other. The plurality of areas include a plurality of first areas and a plurality of second areas. In each of the plurality of pixel regions in each of the first areas, one of (i) the pixel electrode and (ii) the common electrode is formed closer to the liquid crystal layer than the other of (i) the pixel electrode and (ii) the common electrode. In each of the plurality of pixel regions in each of the second areas, the other of (i) the pixel electrode and (ii) the common electrode is formed closer to the liquid crystal layer than the one of (i) the pixel electrode and (ii) the common electrode. The common electrode in each of the first areas is formed in a same layer as the pixel electrode in each of the second areas.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features in the figures may be arbitrarily increased or reduced for clarity of discussion purposes.

FIG. 12A is a plan view for illustrating the method of manufacturing the liquid crystal display device with a touch panel system inside according to the first embodiment.

FIG. 12B is a cross-sectional view taken along line b-b' of FIG. 12A for illustrating the method of manufacturing the liquid crystal display device with a touch panel system inside according to the first embodiment.

DETAILED DESCRIPTION

Figure 1:
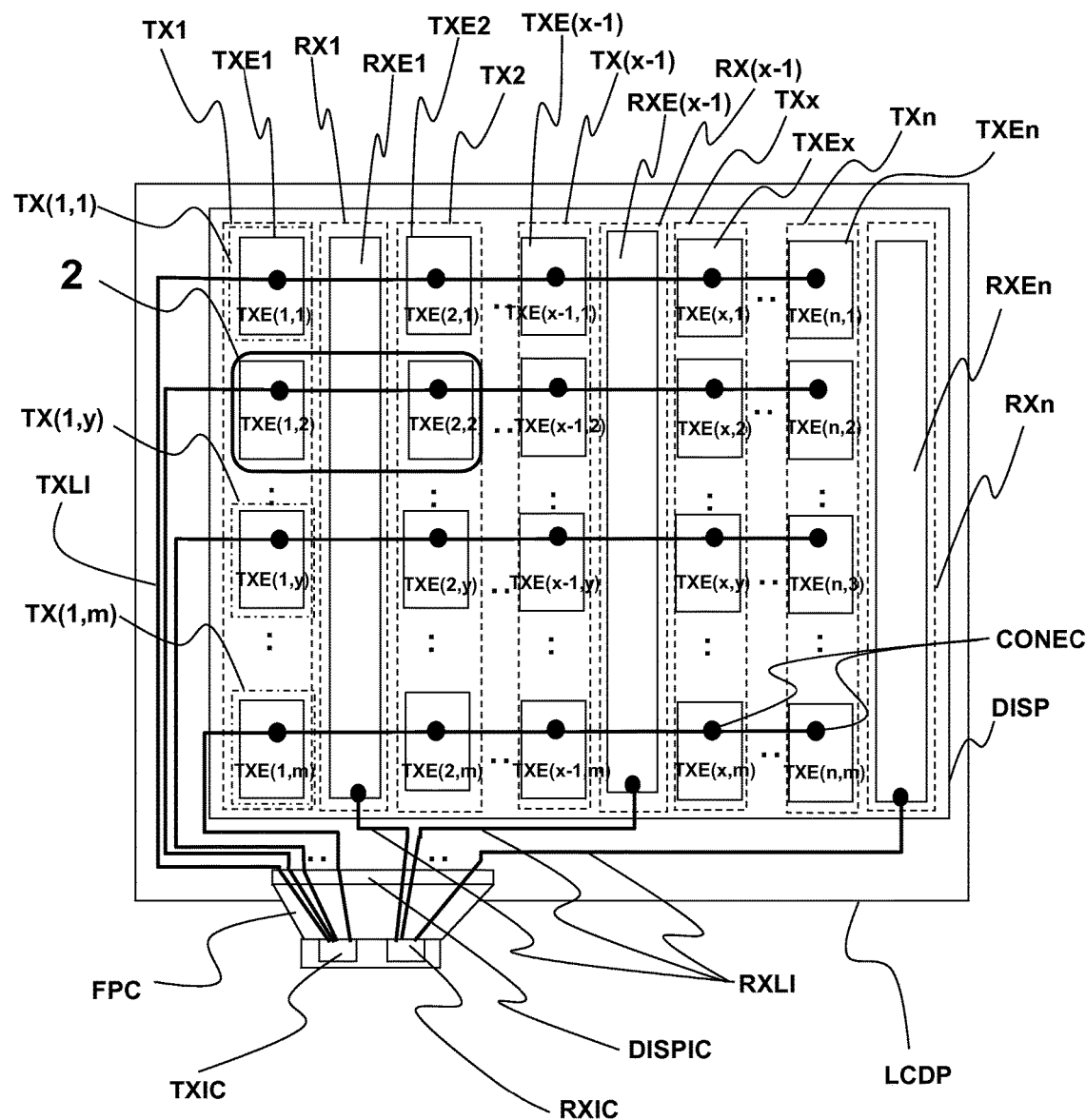
FIG. 1 is a diagram schematically illustrating a liquid crystal display device with a touch panel system inside according to a first embodiment.

Embodiments of the present application will be described below with reference to drawings. In the drawings, the same or similar elements are identified with the same symbols, and their description will not be repeated.

First Embodiment

FIG. 1 is a diagram schematically illustrating a liquid crystal display device with a touch panel system inside according to a first embodiment. The liquid crystal display device with the touch panel system inside LCDP includes a display portion DISP, a touch screen, a display driver DISPIC, a touch drive circuit TXIC and a detect drive circuit RXIC. The touch drive circuit TXIC and the detect drive circuit RXIC are arranged in an outer substrate, and the outer substrate and the liquid crystal display device with the touch panel system inside LCDP are connected through a flexible printed circuit FPC.

The touch screen is built-in in the display portion DISP which displays an image. The touch screen is located in almost the same area as the display portion DISP. The display portion DISP includes plural touch drive electrodes TXE and plural touch detect electrodes RXE. Here, the plural touch drive electrodes TXE and plural touch detect electrodes RXE work as common electrodes CIT, when the liquid crystal display device with the touch panel system inside LCDP is driven in a display mode. The common electrodes CIT are made of transparent conductive materials, e.g., indium-tin-oxide ITO. A region where the touch drive electrode TXE is formed is called a drive electrode region TX, and a region where the touch detect electrode RXE is formed is called a detect electrode region RX.

The drive electrode region TX is divided into n units of drive electrode regions from a first drive electrode region TX1 to a n-th drive electrode region TXn (here and hereinafter, n is an integer that is more than 1). Each drive electrode region TX extends in the vertical direction of the display portion DISP (in an extending direction of data lines), and is spaced apart from another drive electrode region TX in a lateral direction of the display portion DISP (in an extending direction of gate lines). The touch drive electrode TXE formed in an x-th drive electrode region TXx (here and hereinafter, x is an integer that is 1 or more than 1 and n or less than n) is called an x-th touch drive electrode TXEx. And each x-th drive electrode region TXx is divided into m units of drive electrode blocks in a vertical direction of the display portion DISP (in an extending direction of data lines). For example, the first drive electrode region TX1 is divided into m units (here and hereinafter, m is an integer that is more than 1) of drive electrode blocks from a drive electrode block TX (1, 1) to a drive electrode block TX (1, m), which are arranged in the vertical direction of the display portion DISP (in an extending direction of data lines). A drive electrode block which belongs to an x-th drive electrode region from a left edge and y-th drive electrode block from a top edge is called a drive electrode block TX (x, y) (here and hereinafter, y is an integer that is 1 or more and m or less). In this manner, drive electrode blocks are arranged in a matrix on the display portion DISP. A touch drive electrode TXE formed in a drive electrode block TX (x, y) is called a touch drive block electrode TXE (x, y).

On the other hand, the detect electrode region RX is divided into n units of detect electrode regions RX from a first detect electrode region RX1 to an n-th detect electrode region RXn. Each (x−1)-th detect electrode region RX(x−1) extends in a vertical direction of the display portion DISP (in an extending direction of data lines). The first detect electrode region RX1 is arranged at a left side of the display portion, and the n-th detect electrode region RXn is arranged at a right side of the display portion. A touch detect electrode formed in the (x−1)-th detect electrode region RX(x−1) is called an (x−1)-th touch detect electrode RXE(x−1).

A (x−1)-th detect electrode region RX(x−1) is formed sandwiched between a (x−1)-th drive electrode region TX(x−1) and a x-th drive electrode region TXx. A detect electrode region RX and a drive electrode region TX are arranged alternately in a lateral direction of the display portion DISP (in an extending direction of gate lines). A touch drive block electrode TXE (x−1, y) and a touch drive block electrode TXE (x, y) are electrically connected to each other in connection regions CONEC through a drive electrode wiring TXLI. The drive electrode wiring TXLI is drawn out from the display portion DISP and is connected to the touch drive circuit TXIC. And the touch detect electrodes RXE are electrically connected to the detect drive circuit RXIC through detect electrode wirings RXLI.

Figure 2:
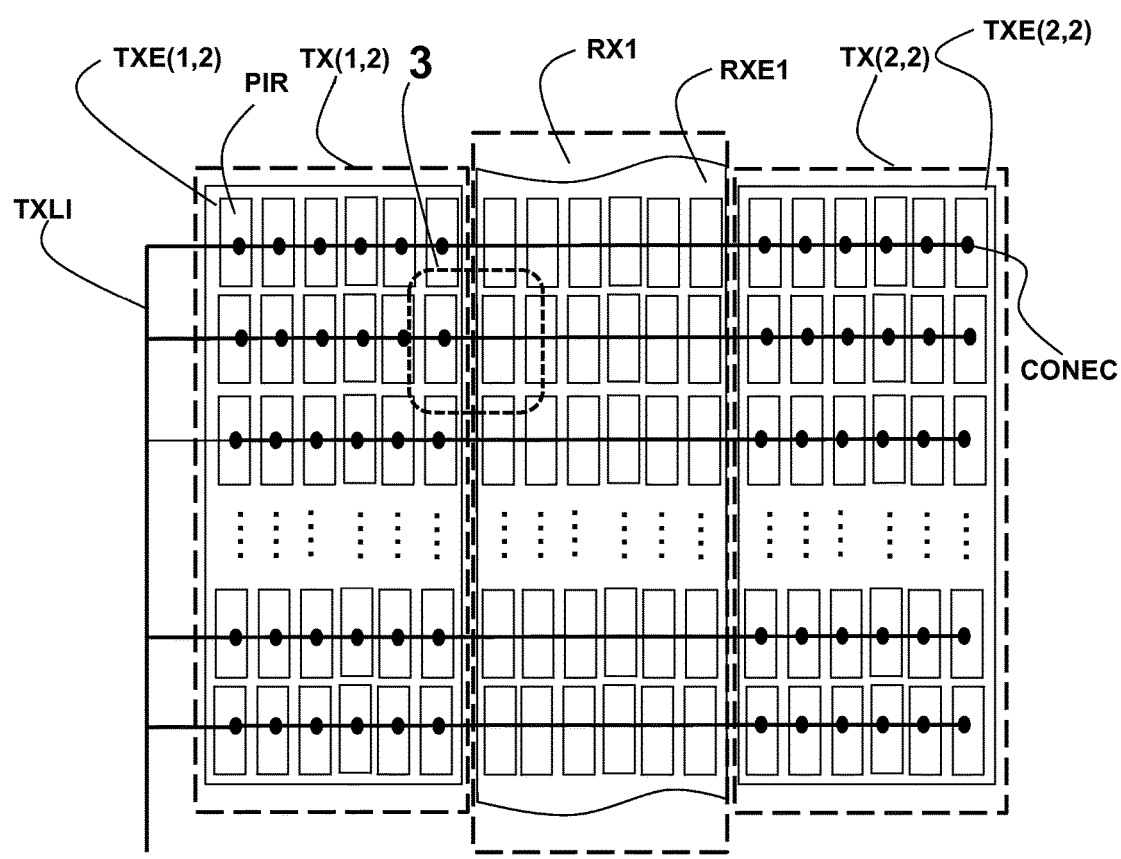
FIG. 2 shows an example of an enlarged plan view of a plurality of pixel regions shown in a region 2 of FIG. 1.

FIG. 2 shows an example of an enlarged plan view of a plurality of pixel regions shown in a region 2 of FIG. 1. It describes a connecting relationship between drive electrode wirings TXLI and touch drive block electrodes TXE in the liquid crystal display with the touch panel system inside LCDP.

Specifically, as shown in FIG. 2, each drive electrode block TX (x, y) includes plural pixel regions PIRs arranged in a matrix. Between the drive electrode block TX (1, 2) and the drive electrode block TX (2, 2), a detect electrode region RX1 is formed. In the detect electrode region RX1, plural pixel regions PIRs are arranged in a matrix. The x-th drive electrode region TXx includes plural drive electrode blocks TX (x, y). For example, a first drive electrode region TX1 includes a drive electrode block TX (1, 1), a drive electrode block TX (1, 2), a drive electrode block TX (1, 3) . . . a drive electrode block TX (1, m). And a touch drive block electrode TXE (x, y) is formed in a drive electrode block TX(x, y). For example, a touch drive block electrode TXE (1, 1) is formed in the drive electrode block TX(1, 1), and a touch drive block electrode TXE (1, m) is formed in the drive electrode block TX(1, m). Here, touch drive block electrodes formed in one drive electrode region TX are insulated from each other and are not electrically connected. In a lateral direction, touch drive block electrodes formed in the same row are electrically connected through drive electrode wirings TXLI. For example, although two touch drive block electrodes TXE (1, 2) and TXE (2, 2) are separated by the touch detect electrode RXE1, these two touch drive block electrodes are electrically connected through the drive electrode wirings TXLI.

In the display mode, each touch drive electrode TXE functions as a common electrode CIT. The touch drive block electrode TXE (x, y) is formed in the same layer to cover the entire drive electrode block TX (x, y). Similarly, the touch detect electrode RXE functions as a common electrode CIT in the display mode, and the touch detect electrode RXE(x−1) is formed in the same layer to cover the entire detect electrode region RX(x−1). In other words, in the display mode, a common voltage is supplied to each touch drive electrode TXE and each touch detect electrode RXE. In this case, drive electrode wirings TXLI may have a role of common lines which are connected to a common voltage circuit (not shown) and transmit common voltage to the touch drive electrodes TXE (that is to say, common electrodes CIT).

An operation of the liquid crystal display with the touch panel system inside LCDP is described as shown in FIG. 2. The liquid crystal display with the touch panel system inside LCDP functions in a display mode and a touch panel mode time-dividedly. For example, a time length of one frame is about 16.7 ms when a frame frequency is 60 Hz. How to determine a time length of sub-frames when the display mode or the touch panel mode is operated is arbitrary. For example, the sub-frame of the display mode is set to 12 ms and the sub-frame of the touch panel mode is set to 4.7 ms.

In a time of the display mode, each thin film transistor TFT formed in each pixel region PIR is driven independently. In each pixel region PIR, a voltage generated between a pixel electrode PIT and a common electrode CIT is applied to a liquid crystal layer LC. The thin film transistor TFT is connected to a gate line GL and data line DL. From the drive circuit DISPIC, a gate voltage and a data voltage are supplied to the thin film transistor TFT through a gate line GL and data line DL. The common voltage is supplied to a common electrode CIT (i.e., the touch drive electrode TXE and the touch detect electrode RXE) in a pixel region.

On the other hand, in a time of the touch panel mode, a pulsatile drive voltage is supplied from the touch drive circuit TXIC to the touch drive electrode TXE. The touch drive block electrode TXE (1, 2) and the touch drive block electrode TXE (2, 2) are electrically connected to each other in connection regions CONEC through the drive electrode wiring TXLI. Further, a detective voltage of direct current is supplied to the touch detect electrode RXE. The detect drive circuit RXIC and the touch detect electrode RXE are connected through the detect electrode wirings RXLI. In the touch panel mode, the detect drive circuit RXIC detects whether there is a touch or not by measuring the change of a mutual capacitance that occurs due to a touch between the touch drive electrode TXE and the touch detect electrode RXE.

Between the touch drive block electrode TXE (1, 2) and the touch drive block electrode TXE (2, 2), the touch detect electrode RXE1 is formed. It is necessary to connect the touch drive block electrode TXE (1, 2) and the touch drive block electrode TXE (2, 2) through the drive electrode wiring TXLI without electrically connecting to the touch detect electrode RXE1.

The touch drive electrode TXE and the touch detect electrode RXE function as the common electrodes CIT in the display mode. Conventionally, common electrodes CIT in an entire display portion are formed in the same layer. Therefore, drive electrode wirings TXL are required to connect between touch drive electrodes TXE formed in different positions by detouring through a conductive layer formed in a different layer to avoid connecting to the touch detect electrode RXE. It may require a region where a contact hole is formed in a pixel region PIR. This may cause a decrease in a pixel aperture ratio in a display portion DISP and increase the number of process steps of manufacturing a liquid crystal display panel.

However, the first embodiment of this present application can obviate these problems. Specific configurations are described below with reference to FIGS. 3 to 6.

Figure 3:
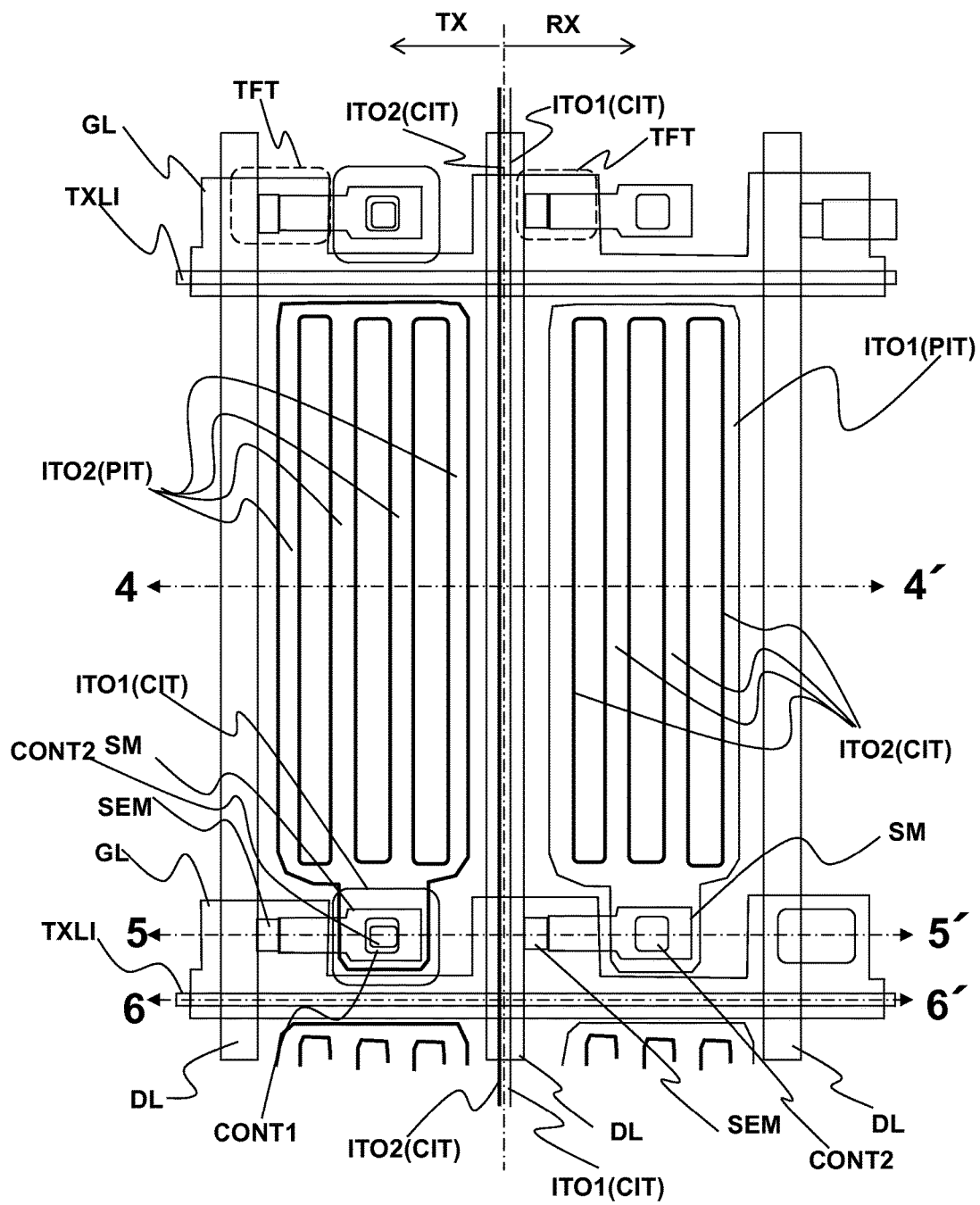
FIG. 3 is an enlarged view of two adjacent pixel regions shown in a region 3 of FIG. 2.
Figure 4:
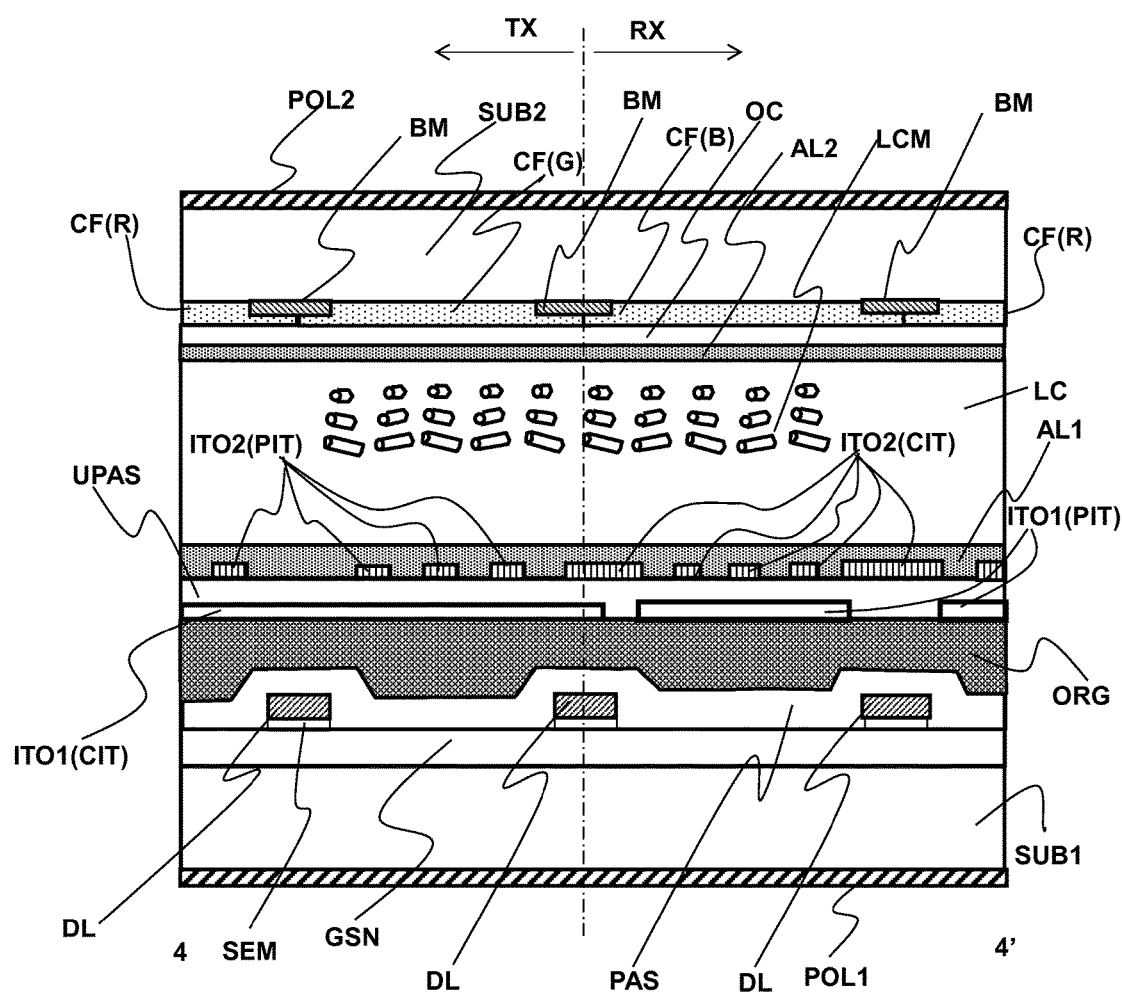
FIG. 4 shows an example of a cross-sectional view taken along line 4-4' of FIG. 3.
Figure 5:
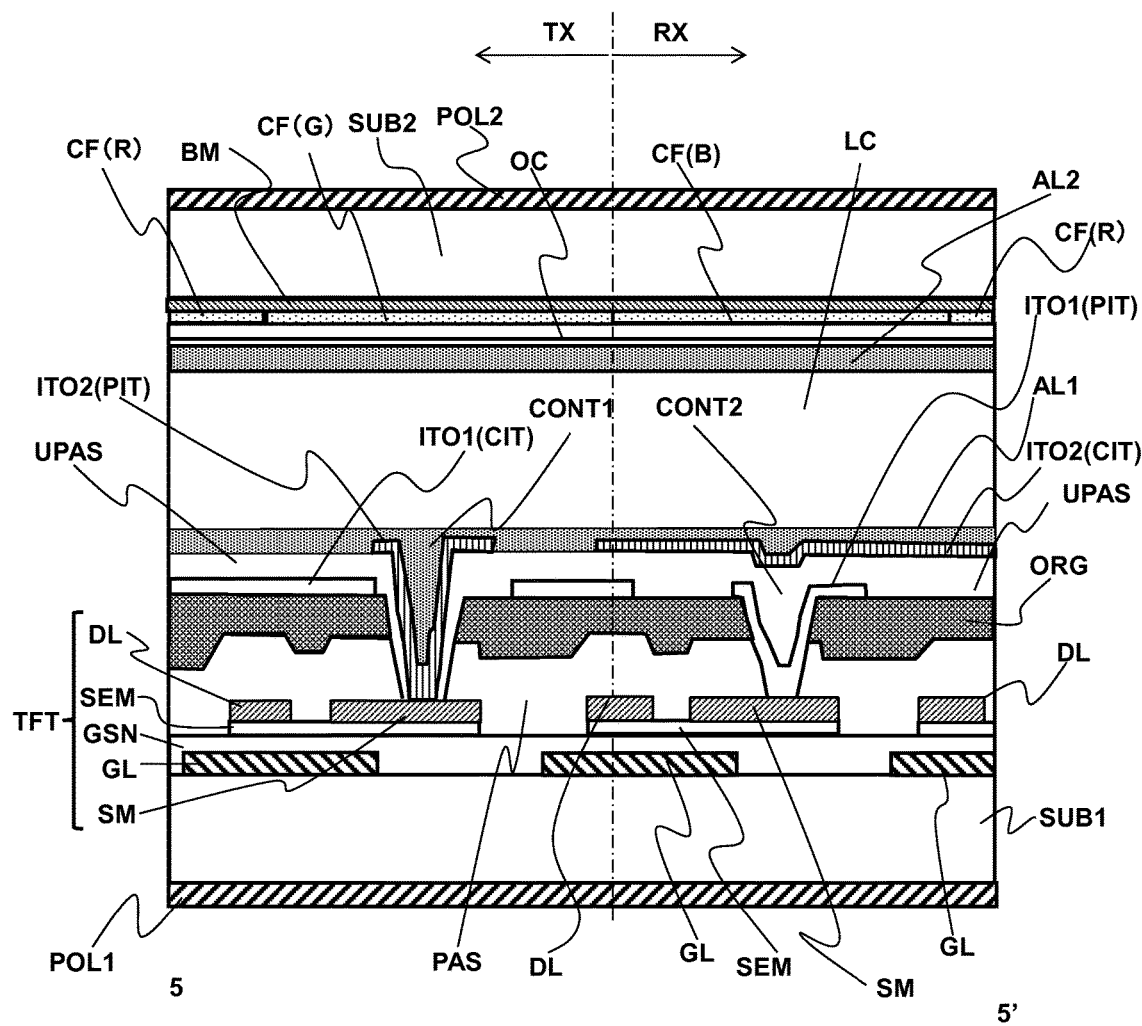
FIG. 5 shows an example of a cross-sectional view taken along line 5-5' of FIG. 3.
Figure 6:
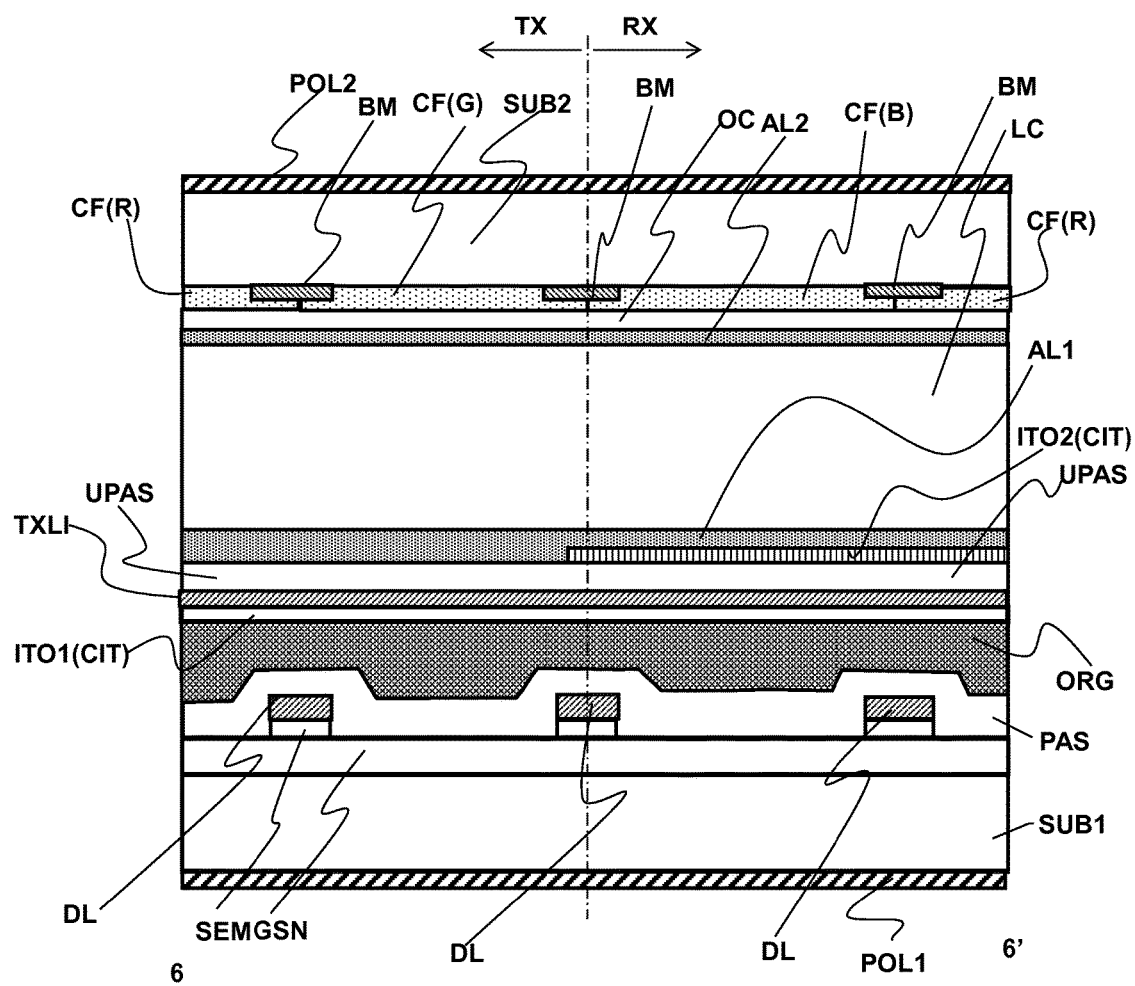
FIG. 6 shows an example of a cross-sectional view taken along line 6-6' of FIG. 3.

FIG. 3 is an enlarged view of two adjacent pixel regions shown in a region 3 of FIG. 2. One of the two pixel regions belongs to a drive electrode region TX, and the other belongs to a detect electrode region RX. FIG. 4 shows an example of a cross-sectional view taken along line 4-4' of FIG. 3. FIG. 5 shows an example of a cross-sectional view taken along line 5-5' of FIG. 3. FIG. 6 shows an example of a cross-sectional view taken along line 6-6' of FIG. 3.

In FIG. 3, one pixel region PIR is a region surrounded by two adjacent gate lines GL and two adjacent data lines DL. The gate lines GL and the data lines DL are connected to a display drive circuit DISPIC. The gate line GL is a wiring that supplies the gate voltage to the thin film transistor TFT, and the data line DL is a wiring that supplies a data voltage to the thin film transistor TFT. A common electrode wiring supplies a common voltage to the common electrode CIT. When a gate-on voltage is supplied to the gate line GL, the resistance of the semiconductor layer SEM of the thin film transistor TFT is lowered. Thus, the data voltage of the data line DL is transmitted to a source electrode SM, and is transmitted to the pixel electrode PIT connected to the source electrode SM. Here, the pixel electrode PIT is made of a transparent conductive material. The data voltage and the common voltage are applied to the pixel electrode PIT and the common electrode CIT, respectively. An electric field between these electrodes is applied to the liquid crystal layer LC and the oval polarization intensity of the liquid crystal layer LC is changed by its electric field intensity to control the transmittance, with the result that a gray-scale display is produced. On the first transparent substrate SUB1, the pixel electrode PIT and the common electrode CIT are formed, and the electric field applied between these two electrodes is propagated and thus the liquid crystal molecules LCM are rotated horizontally to perform gray-scale control, with the result that the display device of so-called in-plane switching (IPS) is achieved. Then, the voltage described above is charged in the capacity of the pixel electrode PIT and the common electrode CIT.

In each pixel region, a storage capacitance is formed to prevent a voltage drop in the liquid crystal layer LC. The storage capacitance is formed in a domain where a pixel electrode PIT and a common electrode CIT are overlapped through an insulation film (upper insulating layer UPAS) sandwiched therebetween. Each gate line GL extends in a lateral direction of the display portion DISP and is arranged with a predetermined pitch in a vertical direction of the display portion DISP. Each data line DL extends in a vertical direction of the display portion DISP and is arranged with a predetermined pitch in a lateral direction of the display portion DISP.

In a pixel region shown in FIG. 3, a left side from the central data line DL is the drive electrode region TX, and a right side from the central data line DL is the detect electrode region RX. In the display mode, a pixel electrode PIT and a common electrode CIT become a pair of electrodes which drive liquid crystal molecules LCM. According to this disclosure, a structure of the pixel electrode PIT and the common electrode CIT is different between the drive electrode region TX and the detect electrode region RX.

As shown in a cross sectional view of FIG. 5, in the drive electrode region TX, a pixel electrode PIT is connected to a source electrode SM through a first contact hole CONT1. As shown in FIG. 3 this pixel electrode PIT has a narrower area than one pixel region in plan view, and plural slits or openings are formed in the pixel electrode PIT. The pixel electrode PIT in the drive electrode region TX is located closer to the liquid crystal layer LC than the common electrode CIT. This common electrode CIT is formed to expand to an entire plural pixel region in a drive electrode block TX (x, y) and overlap with data lines DL and gate lines GL. In the touch panel mode, the common electrode CIT formed in the drive electrode region TX functions as a touch drive electrode TXE.

As shown in a cross sectional view of FIG. 5, in the detect electrode region RX, a pixel electrode PIT is connected to a source electrode SM through a second contact hole CONT2. As shown in FIG. 3, this pixel electrode PIT is formed in one pixel region in plan view. This pixel electrode PIT does not have plural slits or openings. The common electrode CIT in the detect electrode region RX is located closer to the liquid crystal layer LC than the pixel electrode PIT. Plural slits or opening are formed in an overlapping area of the common electrode and the pixel electrode PIT. And this common electrode CIT is formed to expand to plural pixel regions in the detect electrode region RX and overlap with data lines DL and gate lines GL.

As described above, in this embodiment, a common electrode CIT in the drive electrode region TX is formed in the same layer as a pixel electrode PIT in the detect electrode region RX. And a common electrode CIT in the detect electrode region RX is formed in the same layer as a pixel electrode PIT in the drive electrode region TX. These pixel electrode PIT and common electrode CIT in the same layer are formed in the same step of a manufacturing process. This can enhance a pixel aperture ratio of a liquid crystal display with touch panel system inside LCDP and prevent the number of steps of the manufacturing process from increasing.

In FIG. 3, the drive electrode wiring TXLI connects between plural touch drive block electrodes (e.g., TXE (1, 2) and TXE (2, 2)) in FIG. 1. In the drive electrode region TX, the drive electrode wiring TXLI is electrically connected to a common electrode CIT with direct contact. In the touch panel mode, the common electrode CIT formed in the drive electrode region TX functions as the touch drive electrode TXE. On the other hand, this drive electrode wiring TXLI crosses the detect electrode region RX in plan view in an extending direction of gate lines GL. A pixel electrode PIT formed in the detect electrode region RX is formed independently within a pixel region PIR. Then, there is a space between two adjacent pixel electrodes PIT. The drive electrode wiring TXLI can be formed in this space between plural pixel electrodes, and can be insulated from adjacent pixel electrodes PIT in the detect electrode region RX.

Accordingly, in this embodiment, plural touch drive block electrodes TXE (x, y) (in this case, x is a variable and y is a fixed number) formed in a lateral direction of the display portion DIPS are connected mutually through the drive electrode wiring TXLI without contact holes. This can achieve a liquid crystal display with touch panel system inside LCDP without decreasing a pixel aperture ratio and without increasing the number of steps of the manufacturing process.

FIG. 4 is a cross sectional view of two pixel regions adjacent to a central data line DL which is a border line between the two pixel regions. On a second transparent substrate SUB2, color filters CF of different colors such as a red color filter CF(R), a green color filter CF(G) and a blue color filter CF(B) are arranged across a data line DL. A black matrix BM is formed along a border of pixel regions PIR. In FIG. 4, a left side of the central data line DL is the drive electrode region TX, and a right side of the central data line DL is the detect electrode region RX.

The liquid crystal layer LC is interposed between two substrates including the first transparent substrate SUB1 on a back side and the second transparent substrate SUB2 on a front display side.

A first polarization plate POL1 and a second polarization plate POL2 are adhered to the outside of the first transparent substrate SUB1 and the second transparent substrate SUB2, respectively. On both sides of the liquid crystal layer, a first alignment film AL1 and a second alignment film AL2 that can fix the liquid crystal molecules LCM thereto are formed. Since the pigment melts into the liquid crystal layer LC to become a contaminating source, its surface is coated with an overcoat film OC that is an organic material.

On the first transparent substrate SUB1, various thin films included in a thin film transistor TFT are formed. On a gate insulating film GSN, data lines DL are formed parallel to each other. Over the data lines DL, a protective insulating film PAS and an organic protective film ORG are formed.

A structure of the pixel electrode PIT and the common electrode CIT is different between the drive electrode region TX and the detect electrode region RX shown in FIG. 4. In the drive electrode region TX, a first transparent conductive material ITO1 layered on an organic protective film ORG is shaped into a common electrode CIT. The common electrode CIT in the drive electrode region TX is formed overlapping with data lines at a border of adjacent pixel regions. The pixel electrode PIT on an upper insulating layer UPAS which is formed on the common electrode CIT has plural slits or openings in a pixel region. In the display mode, when a data voltage based on an image data is applied to the pixel electrode PIT, an electric field generated between the pixel electrode PIT and the common electrode CIT reaches a liquid crystal layer LC through the slits of the pixel electrodes PIT. This electric filed drives liquid crystal molecules LCM in the liquid crystal layer LC and an image can be displayed.

The common electrodes CIT in the detect electrode region RX and in the drive electrode region TX are arranged overlapping with data lines DL. Further, a central data line DL which separates the detect electrode region RX from the drive electrode region TX is overlapped with both common electrodes in the detect electrode region RX and in the drive electrode region TX. Therefore, data lines DL formed in any region of a liquid crystal display with the touch panel system inside LCDP are shielded by the common electrodes CIT. This can inhibit unnecessary electric field expelled from data lines DL from invading liquid crystal layer LC and enhance a pixel aperture ratio.

FIG. 5 shows a cross sectional structure including adjacent thin film transistors TFT in the drive electrode region TX and the detect electrode region RX. The pixel electrode PIT is electrically connected to a source electrode SM. In the drive electrode region TX, a pixel electrode PIT is connected to a source electrode SM of a thin film transistor TFT through a first contact hole CONT1 formed in a protective insulating film PAS, an organic protective film ORG and an upper insulating layer UPAS. The pixel electrode PIT is formed on the liquid crystal layer LC side of the upper insulating layer UPAS.

On the other hand, in the detect electrode region RX, a pixel electrode PIT is connected to a source electrode SM of a thin film transistor TFT through a second contact hole CONT2 formed in a protective insulating film PAS and an organic protective film ORG. The pixel electrode PIT is formed on the first transparent substrate SUB1 side of the upper insulating layer UPAS.

FIG. 6 shows a cross-sectional view taken along a drive electrode wiring TXLI on a boundary between the drive electrode region TX and the detect electrode region RX. Common electrodes CIT on the drive electrode region TX are connected directly to the drive electrode wiring TXLI. In the drive electrode region TX, the drive electrode wiring TXLI formed on the common electrode CIT extends to the detect electrode region RX. In the detect electrode region RX, the drive electrode wiring TXLI is insulated from the common electrode CIT by the upper insulating layer UPAS. Further, in the detect electrode region RX, a first transparent conductive material ITO1 with the same width as the drive electrode wiring TXLI is laminated on the drive electrode wiring TXLI. This is because the first transparent conductive material ITO1 and the drive electrode wiring TXLI are etched by the same photo-process.

In this embodiment, pixel structures, that is, in the drive electrode region TX, the pixel electrode PIT is formed closer to the liquid crystal layer LC than the common electrode CIT, and, in the detect electrode region RX, the common electrode CIT is formed closer to the liquid crystal layer LC than the pixel electrode PIT, are described. However, this configuration may be reversed. In other words, the structures are changeable, that is, in the drive electrode region TX, the common electrode CIT can be formed closer to the liquid crystal layer LC than the pixel electrode PIT, and, in the detect electrode region RX, the pixel electrode PIT can be formed closer to the liquid crystal layer LC than the common electrode CIT.

A method of manufacturing the liquid crystal display device with the touch panel system inside LCDP according to the present embodiment will now be described. FIGS. 7A to 12B are diagrams for illustrating the method of manufacturing the liquid crystal display device with the touch panel system inside LCDP according to the present embodiment. FIGS. 7A, 8A, 9A, 10A, 11A and 12A correspond to the steps of the plan view of FIG. 3, and FIGS. 7B, 8B, 9B, 10B, 11B and 12B correspond to the steps of cross-sectional views of FIG. 5.

Figure 7A:
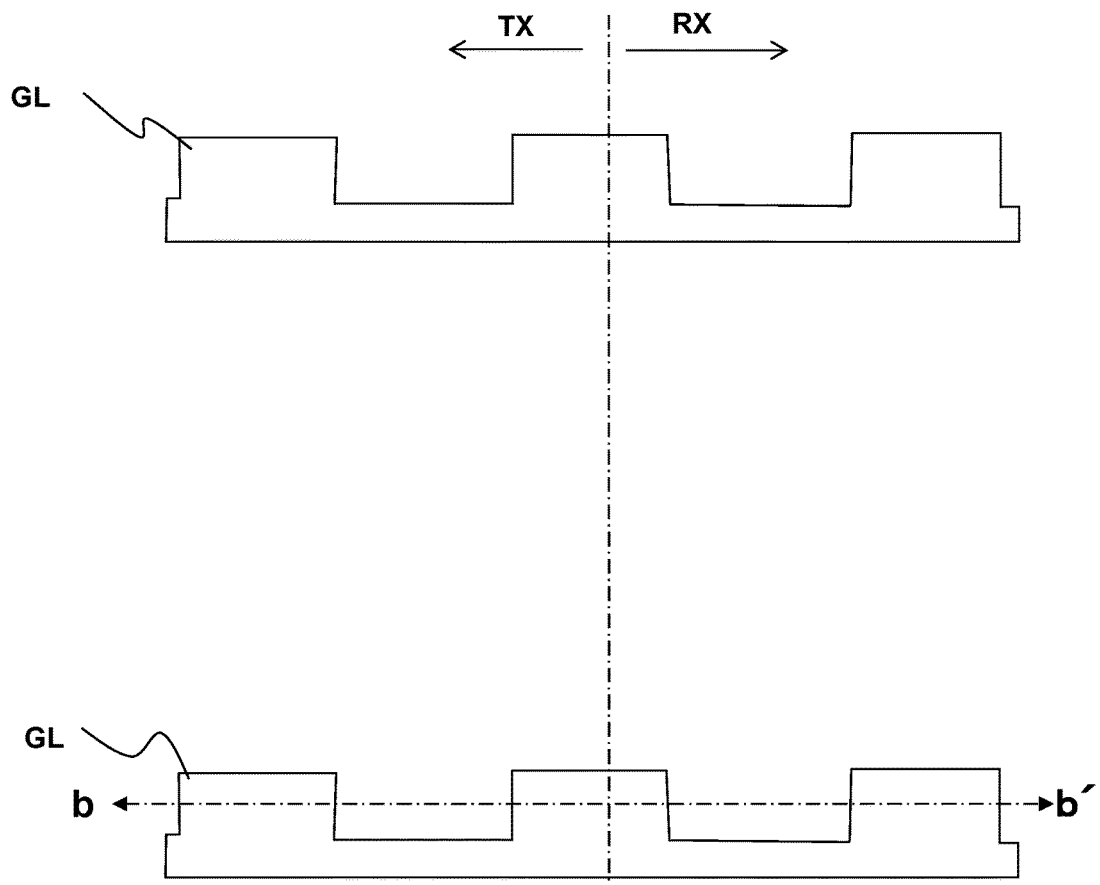
FIG. 7A is a plan view for illustrating a method of manufacturing a liquid crystal display device with a touch panel system inside according to a first embodiment.
Figure 7B:
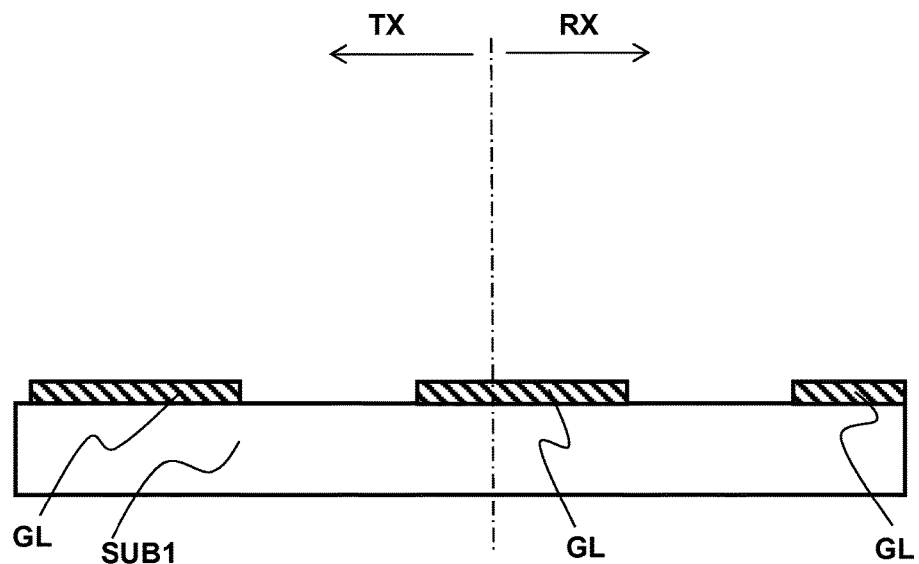
FIG. 7B is a cross-sectional view taken along line b-b' of FIG. 7A for illustrating the method of manufacturing the liquid crystal display device with a touch panel system inside according to the first embodiment.

FIG. 7A shows a plan view of the two adjacent pixel regions of FIG. 3 after the completion of the first photo-step. FIG. 7B shows a cross-sectional view taken along line b-b' of FIG. 7A. The adjacent gate lines GL are formed into a film by sputtering on the first transparent substrate SUB1, and are patterned in the first photo-step. The gate line GL is a stacked film in which, for example, molybdenum Mo is formed into a film on the copper of 100 nm to 300 nm. As the wiring material, for example, not only copper Cu but also a stacked film of molybdenum Mo and aluminum Al, a stacked film of titanium Ti and aluminum Al, an alloy MoW of molybdenum Mo and tungsten W and the like can be used.

Figure 8A:
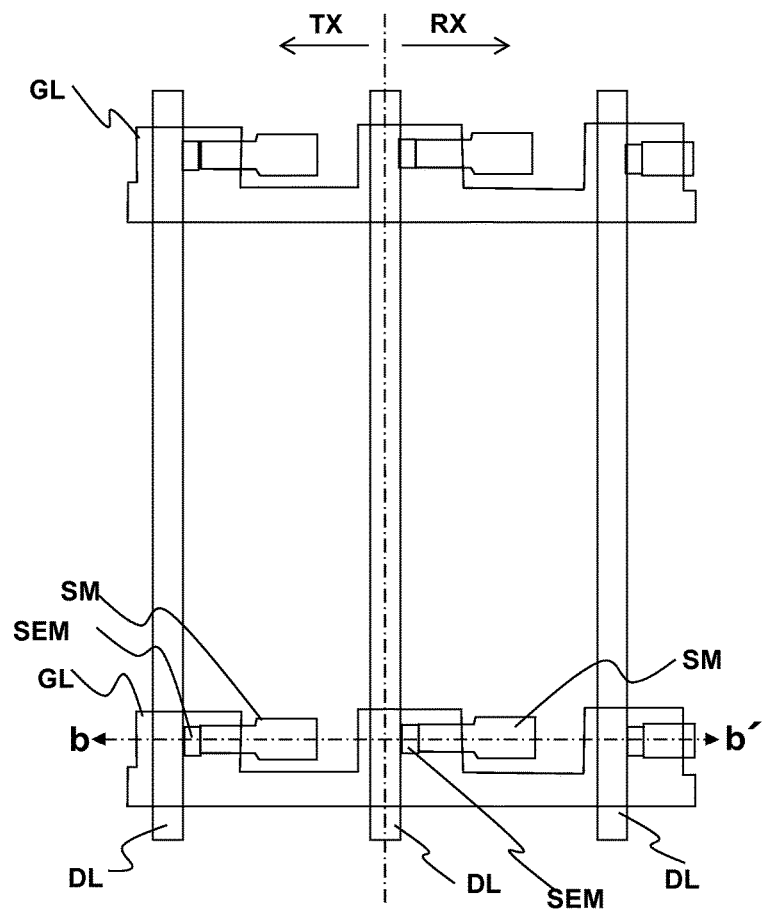
FIG. 8A is a plan view for illustrating the method of manufacturing the liquid crystal display device with a touch panel system inside according to the first embodiment.
Figure 8B:
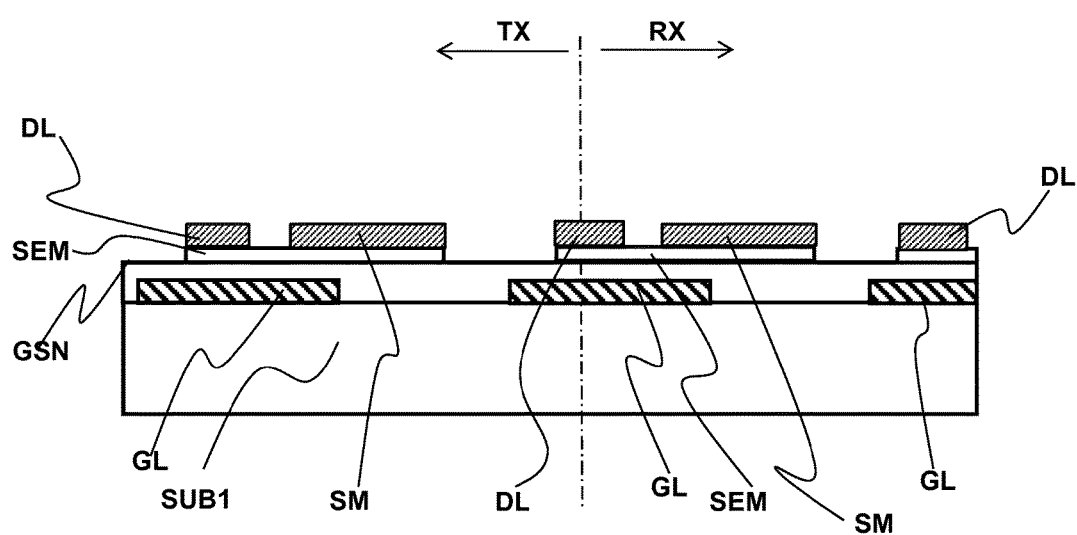
FIG. 8B is a cross-sectional view taken along line b-b' of FIG. 8A for illustrating the method of manufacturing the liquid crystal display device with a touch panel system inside according to the first embodiment.

FIGS. 8A and 8B show a plan view and a cross-sectional view when a second photo-step is completed. As shown in FIGS. 8A and 8B, for example, on the gate line GL, the gate insulting film GSN of silicon nitride and the semiconductor layer SEM of amorphous silicon are stacked in layers by chemical vapor deposition (CVD). The thickness of the gate insulting film GSN and the semiconductor layer SEM are, for example, about 400 nm and 200 nm, respectively. Further, on the upper portion of the semiconductor layer SEM, a stacked film of molybdenum Mo and copper Cu is formed by sputtering into a film. As the material of the stacked film, for example, as with the material of the gate line GL, a three-layer film of molybdenum Mo, aluminum Al and molybdenum Mo, a stacked film of titanium Ti and aluminum Al, an MoW alloy or the like can be used.

Next, as shown in FIG. 8B, the data lines DL, the source electrodes SM connecting to the pixel electrodes PIT and semiconductor layer SEM are manufactured simultaneously. In this photo-step, a multiple gradation mask having three levels of light transmissivity, such as a half-tone mask or a gray tone mask, is used as the photo mask, and thereby two resist films having different thickness are formed. Specifically, a thin resist film having a pattern corresponding to the semiconductor layer SEM and a thick resist film, thicker than the thin resist film, corresponding to the data lines DL and the source electrode SM are formed. It is possible to pattern the semiconductor layer SEM, the data lines DL and source electrodes SM in one photo-step.

Figure 9A:
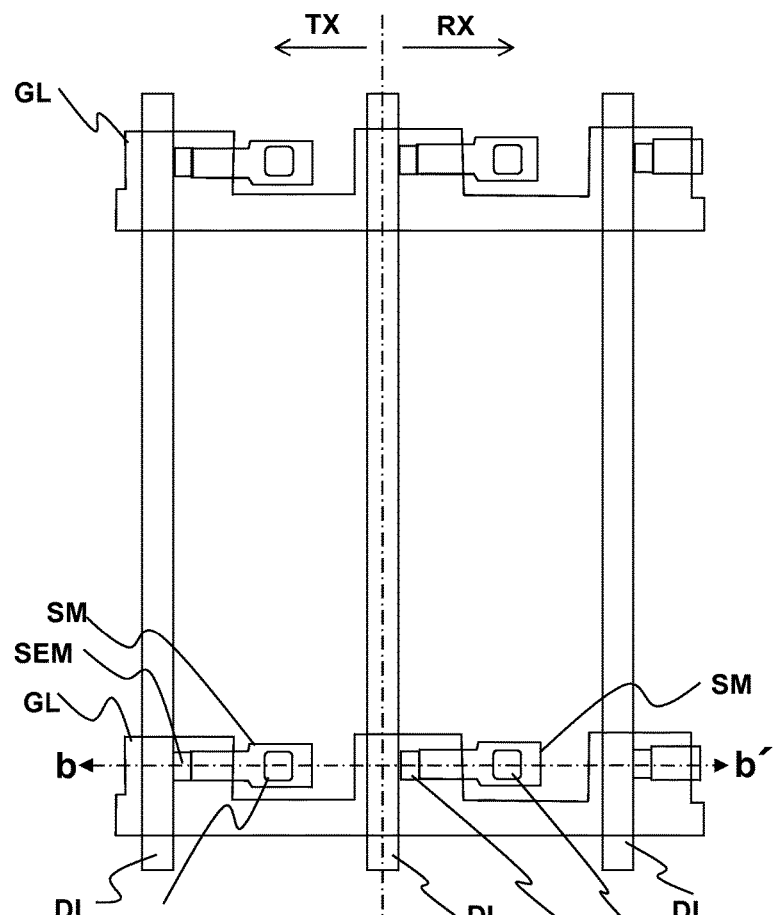
FIG. 9A is a plan view for illustrating the method of manufacturing the liquid crystal display device with a touch panel system inside according to the first embodiment.
Figure 9B:
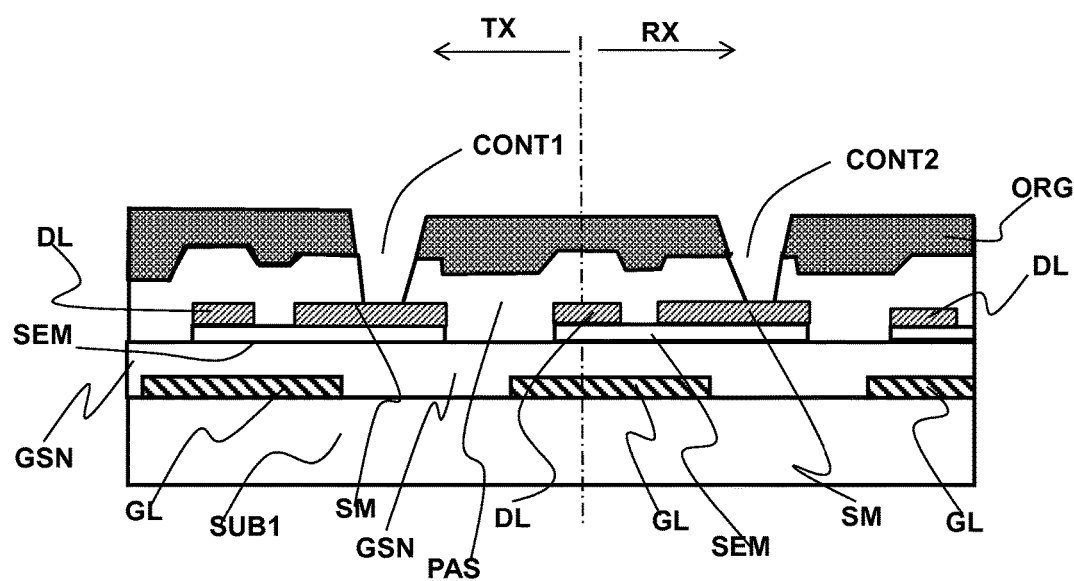
FIG. 9B is a cross-sectional view taken along line b-b' of FIG. 9A for illustrating the method of manufacturing the liquid crystal display device with a touch panel system inside according to the first embodiment.

FIGS. 9A and 9B show a plan view and a cross-sectional view, when a third photo-step is completed. On the data line DL and the source electrode SM, the protective insulating film PAS is formed by CVD, and then the organic protective film ORG of photosensitive acrylic is coated. The protective insulating film PAS is formed of, for example, silicon nitride, and its thickness is, for example, 200 to 600 nm. Since the material of the photosensitive acrylic itself can be used as the photoresist in the photo-step, an opening portion is formed on the source electrode SM with a photo mask by development processing. Further, the protective insulating film PAS undergoes a dry-etching step and a first contact hole CONT1 and a second contact hole CONT2 are formed in the protective insulating film PAS.

Figure 10A:
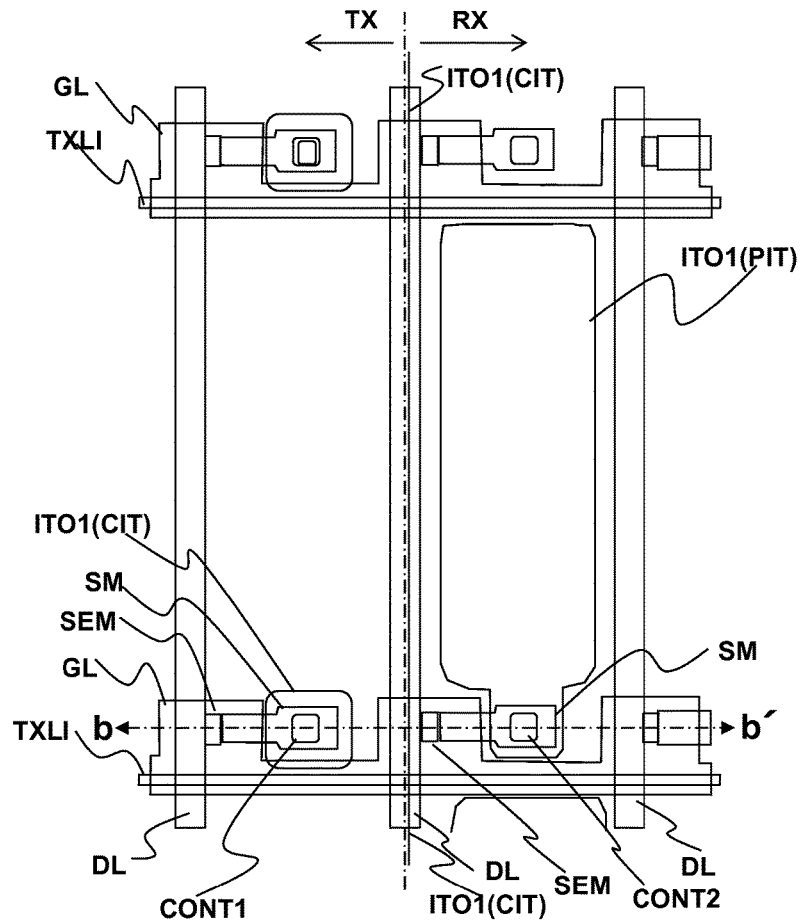
FIG. 10A is a plan view for illustrating the method of manufacturing the liquid crystal display device with a touch panel system inside according to the first embodiment.
Figure 10B:
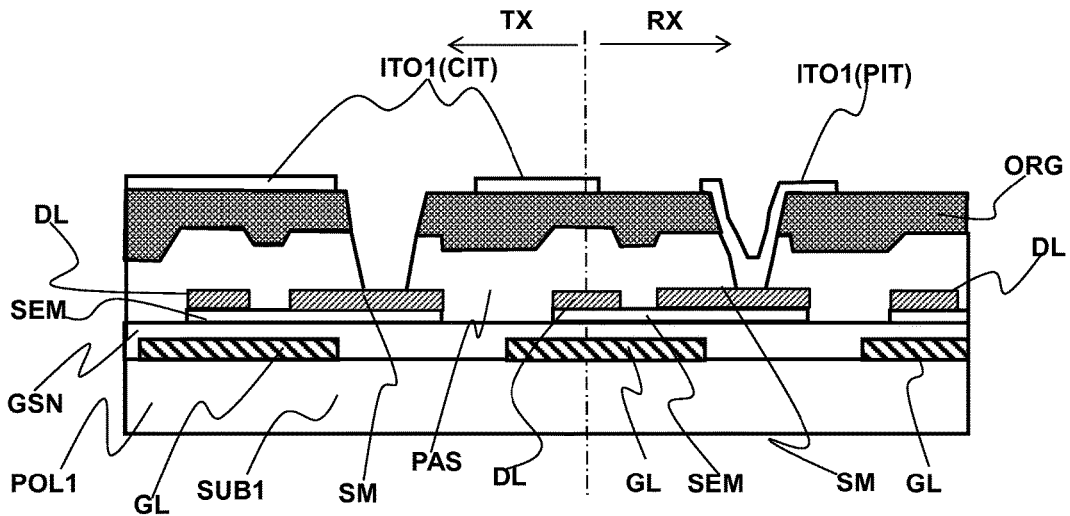
FIG. 10B is a cross-sectional view taken along line b-b' of FIG. 10A for illustrating the method of manufacturing the liquid crystal display device with a touch panel system inside according to the first embodiment.

FIGS. 10A and 10B show a plan view and a cross-sectional view, when a fourth photo-step is completed. A first transparent conductive material ITO1 of indium-tin-oxide is formed into a film, and the first transparent electrode is formed on the organic protective film ORG through a photo-etching step. After this step, the first transparent conductive material has a different function and plan pattern in the drive electrode region TX than in the detect electrode region RX. In the drive electrode region TX, this first transparent conductive material ITO1 functions as the common electrodes CIT (the touch drive electrodes TXE). It is patterned to open a hole around the first contact hole CONT1, and is little patterned in the other region. On the other hand, in the detect electrode region RX, this first transparent conductive material ITO1 functions as the pixel electrode PIT, and is patterned to a shape along the pixel region in plan view.

In this photo-step, the first transparent conductive material ITO1 and a metal layer which is formed into the drive electrode wirings TXLI are deposited successively. And then, with a multiple gradation mask having three levels of light transmissivity, it is divided into three regions, such as a first region where the drive electrode wirings TXLI is deposited on the first transparent conductive material ITO1, a second region where the first transparent conductive material ITO1 is patterned into the common electrodes CIT in the drive electrode region TX and the third region where pixel electrodes are formed in the detect electrode region RX.

Figure 11A:
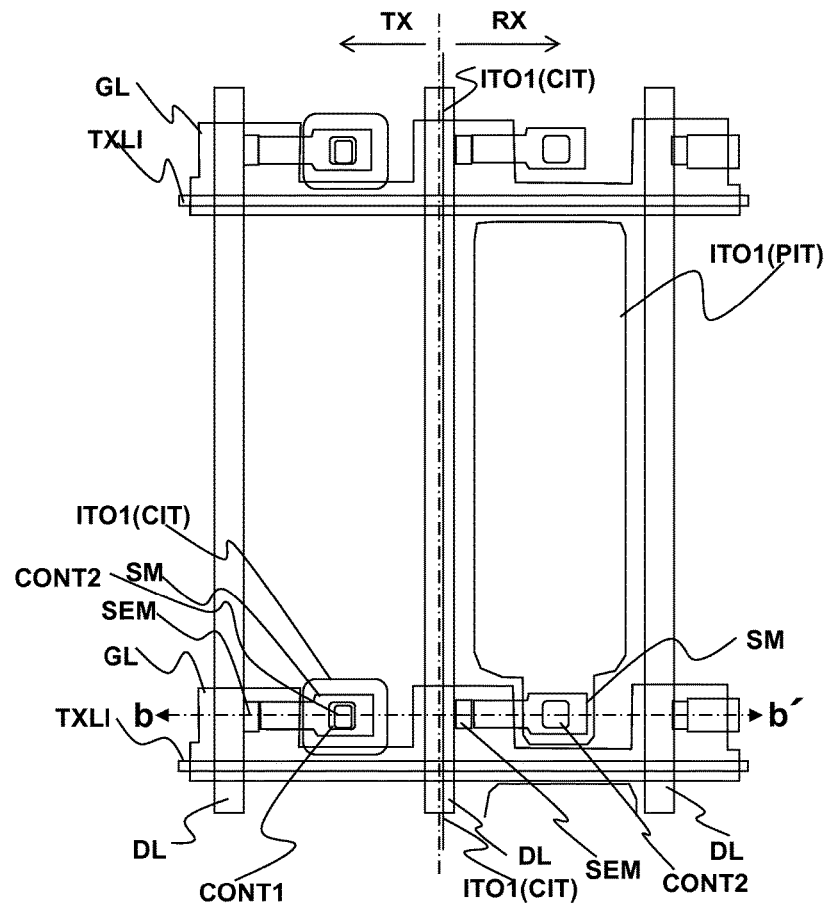
FIG. 11A is a plan view for illustrating the method of manufacturing the liquid crystal display device with a touch panel system inside according to the first embodiment.
Figure 11B:
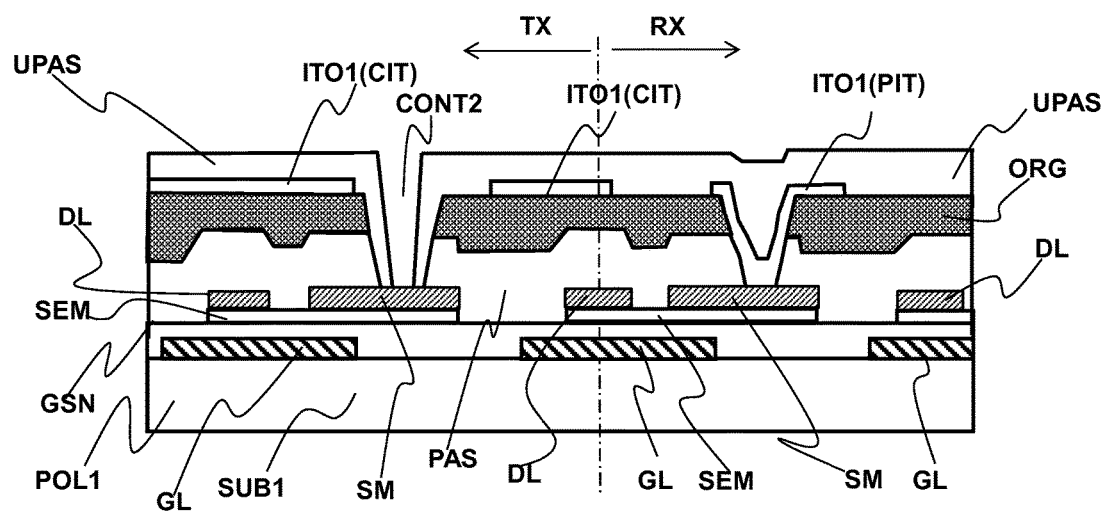
FIG. 11B is a cross-sectional view taken along line b-b' of FIG. 11A for illustrating the method of manufacturing the liquid crystal display device with a touch panel system inside according to the first embodiment.

FIGS. 11A and 11B show a plan view and a cross-sectional view, when a fifth photo-step is completed. The upper insulating film UPAS is formed on common electrodes CIT in the drive electrode region TX and pixel electrodes PIT in the detect electrode region RX etched from the first transparent conductive material ITO1. The upper protective film UPAS is formed of, for example, silicon nitride, and its thickness is, for example, 200 to 600 nm. A second contact hole CONT2, which is an opening portion, is formed. The second contact hole CONT2 is formed through the photo-step and a dry-etching step in the upper insulting film UPAS such that the source electrode SM is exposed at the bottom thereof.

FIGS. 12A and 12B show a plan view and a cross-sectional view, when a sixth photo-step is completed. A second transparent conductive material of indium-tin-oxide ITO is formed into a film, and the second transparent electrode is formed into the pixel electrodes PIT in the drive electrode regions TX and common electrodes CIT (touch detect electrodes RXE) in the detect electrode regions RX through a photo-etching step.

As described above, it is possible to form the display device of the present embodiment by six steps of photo-etchings. In the above description, only the steps of manufacturing the so-called TFT substrate are discussed, and since the steps of manufacturing the color filter substrate and the like are known, their descriptions are omitted.

The present invention is not limited to the embodiment described above, and may be replaced with substantially the same configuration as that described in the embodiment, a configuration having the same effect of operation or a configuration that can achieve the same object.

Second Embodiment

A second embodiment in this present application is described with reference to the figures. Note that a part identical to that which is described in the first embodiment is given an identical reference numeral in the respective diagrams.

Figure 13:
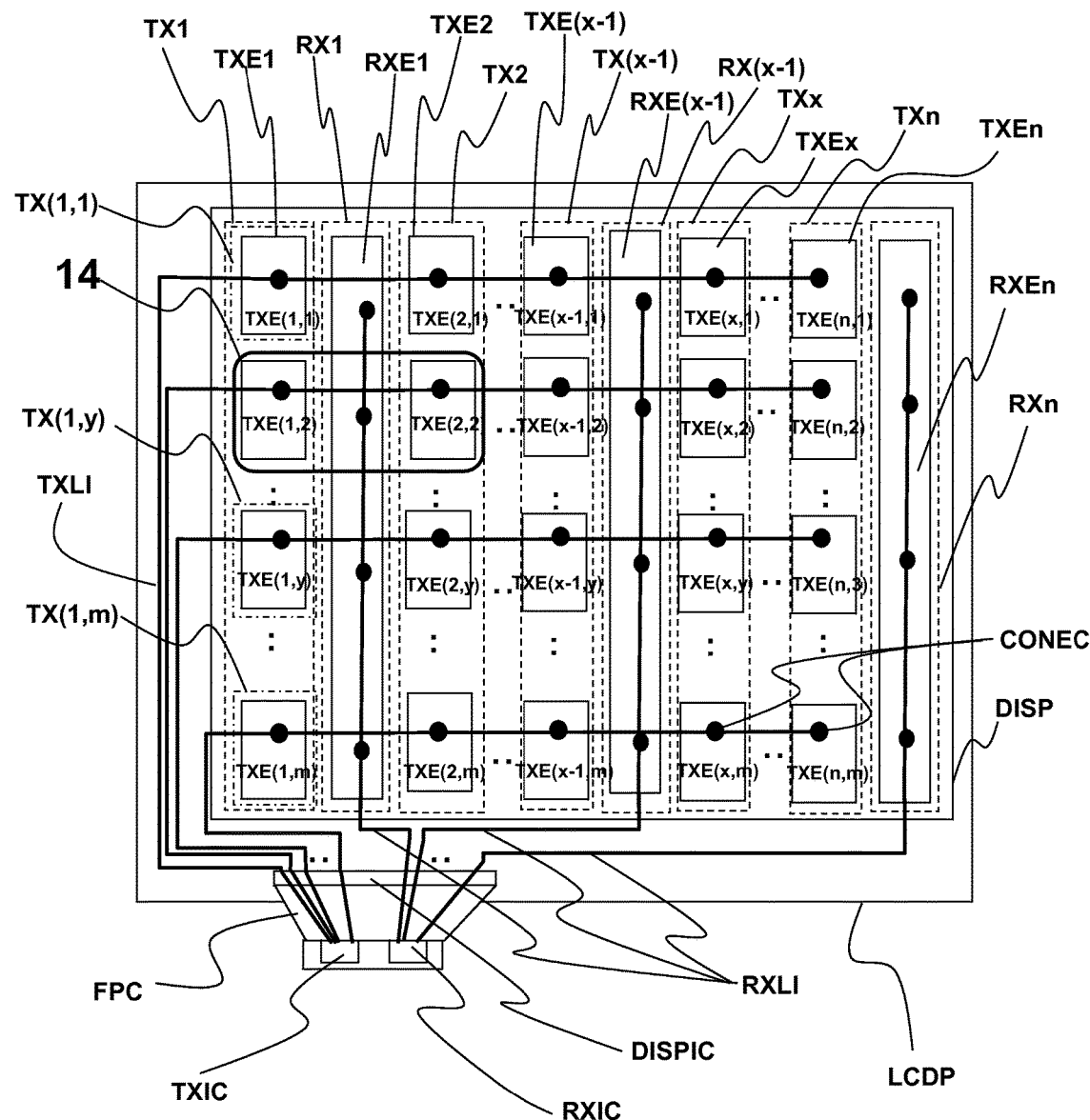
FIG. 13 is a diagram schematically illustrating a liquid crystal display device with a touch panel system inside according to a second embodiment.
Figure 14:
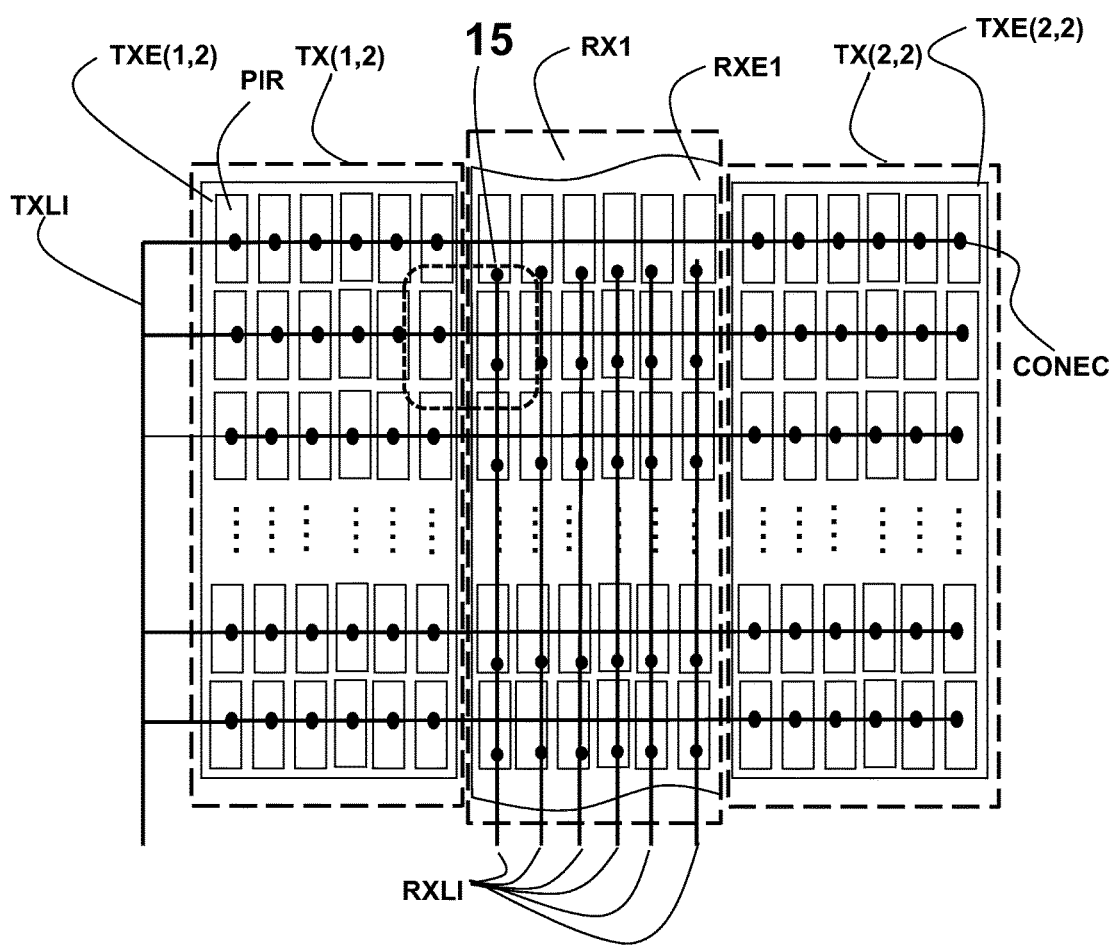
FIG. 14 shows an example of an enlarged plan view of a plurality of pixel regions shown in a region 14 of FIG. 13.
Figure 15:
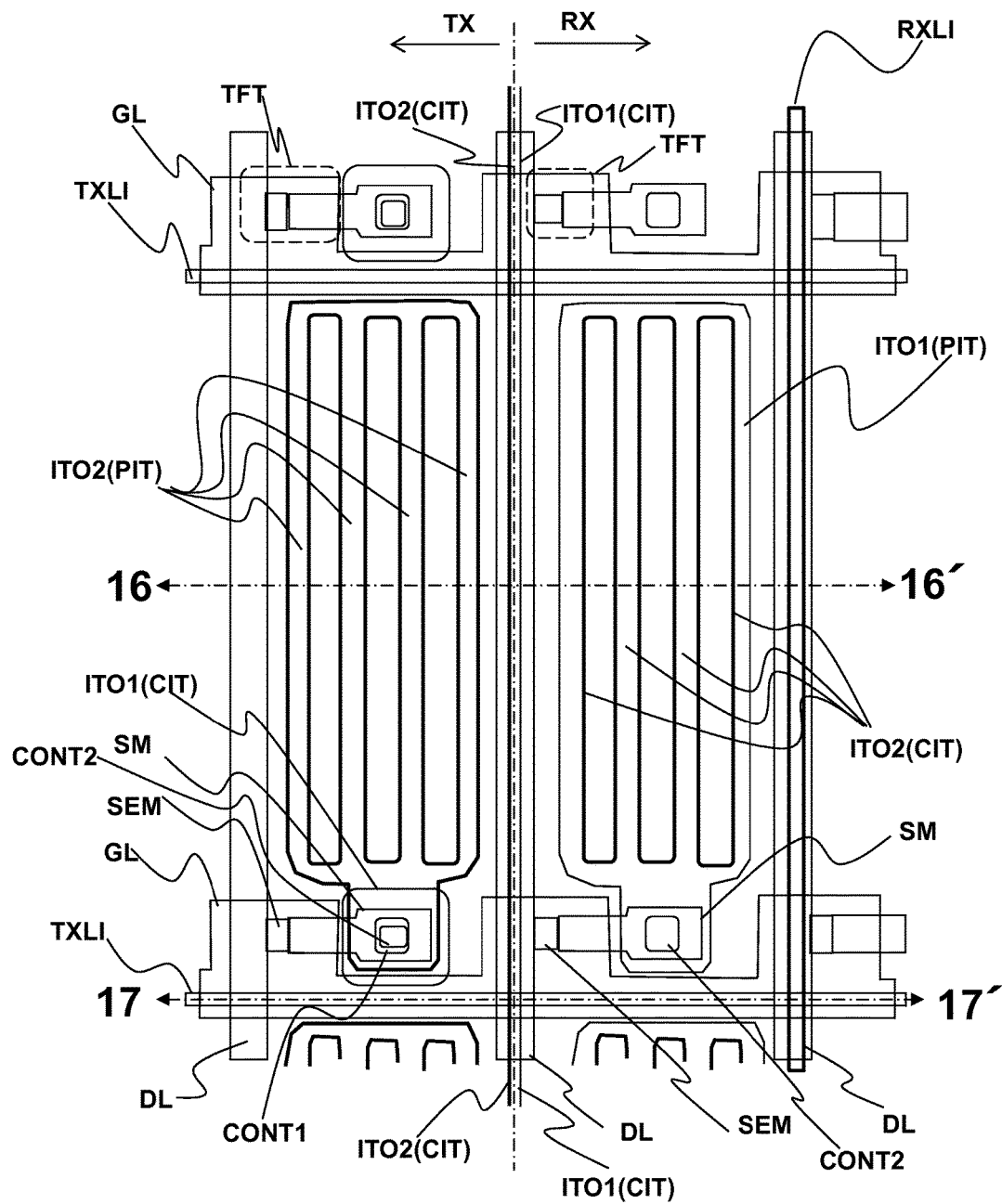
FIG. 15 is an enlarged view of two adjacent pixel regions shown in a region 15 of FIG. 14.
Figure 16:
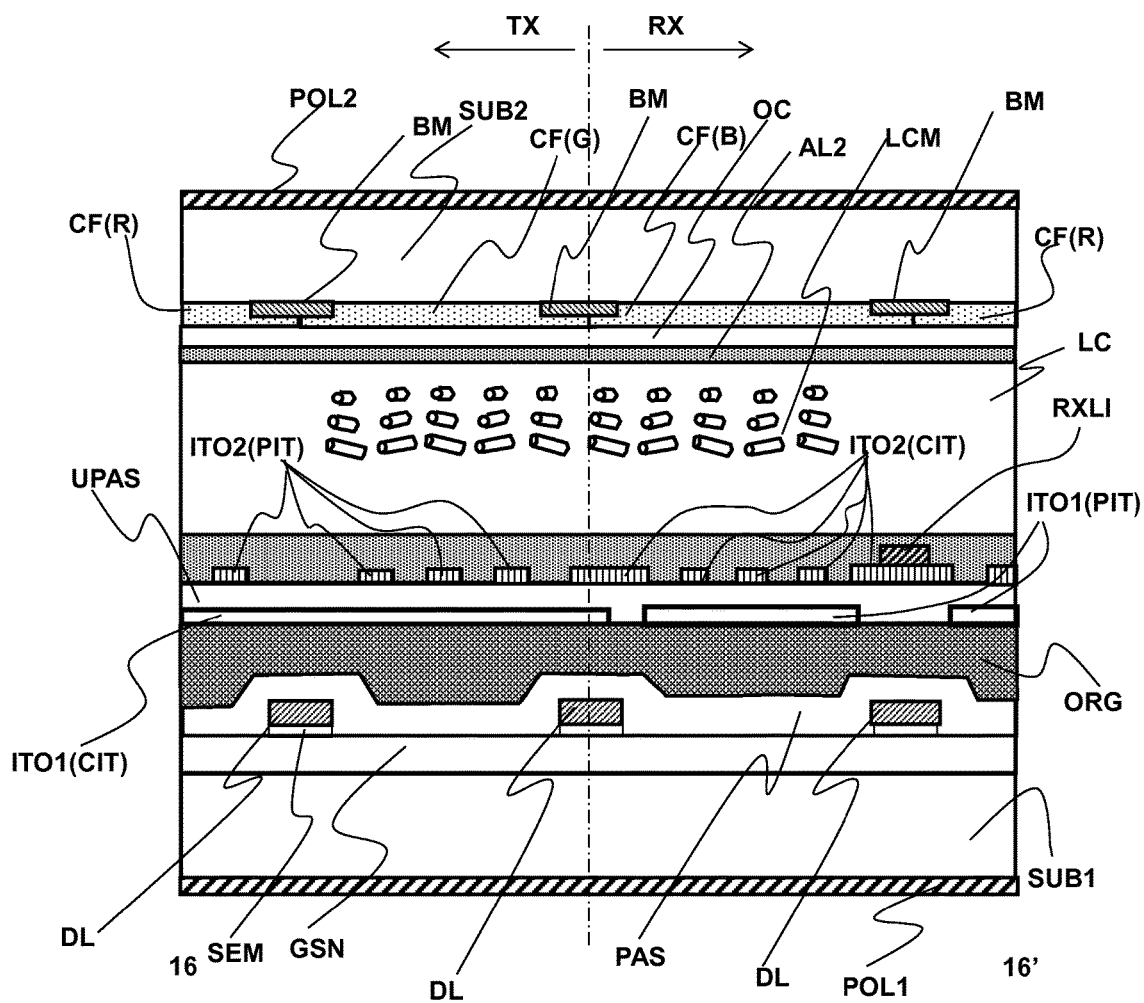
FIG. 16 shows an example of a cross-sectional view taken along line 16-16' of FIG. 15.
Figure 17:
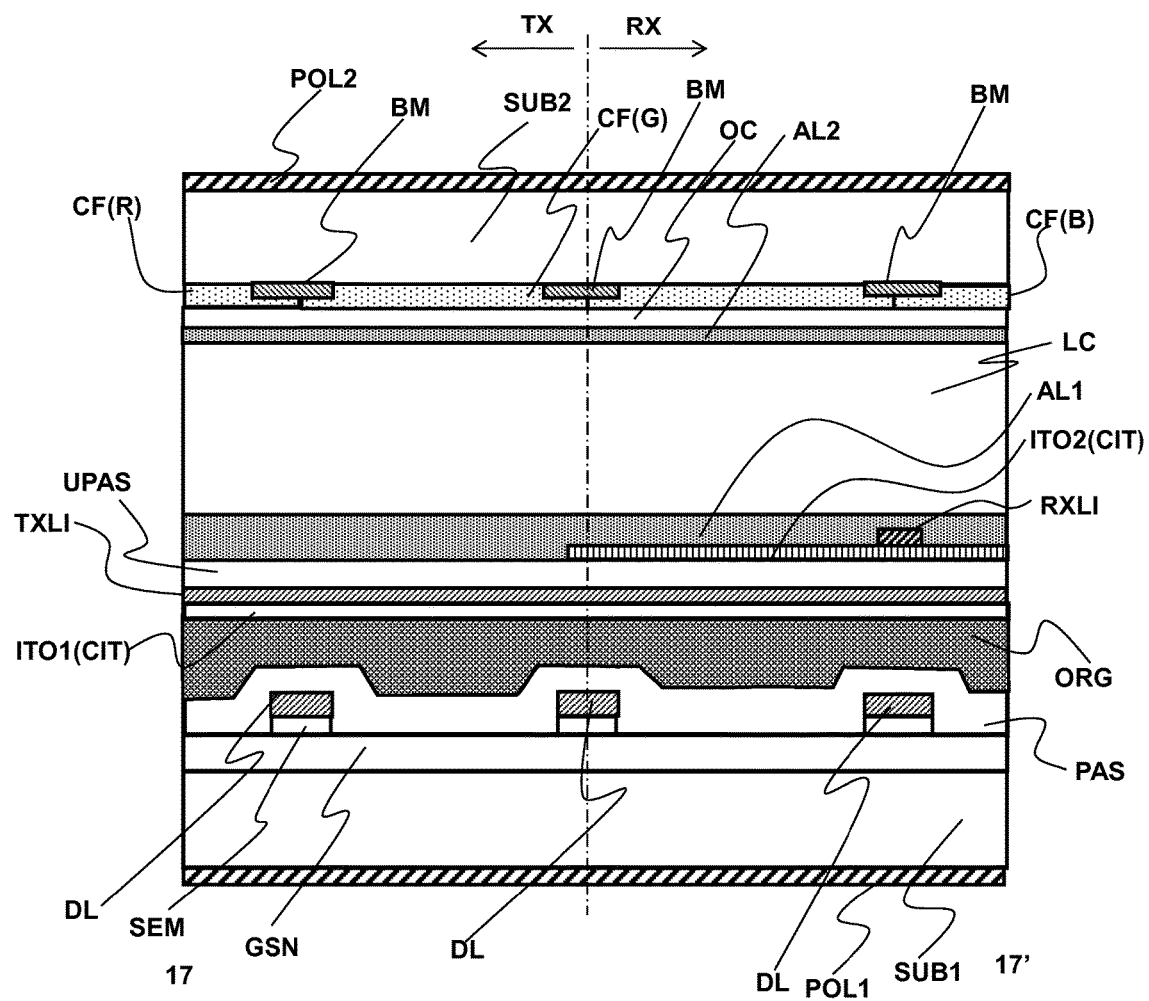
FIG. 17 shows an example of a cross-sectional view taken along line 17-17' of FIG. 15.

FIG. 13 is a diagram schematically illustrating a liquid crystal display device with a touch panel system inside LCDP according to this second embodiment. The main structure is similar to that in FIG. 1. FIG. 14 shows an example of an enlarged plan view of a plurality of pixel regions shown in a region 14 of FIG. 13. FIG. 15 is an enlarged view of two adjacent pixel regions shown in a region 15 of FIG. 14 which belong to a pixel region PIR in the drive electrode region TX and a pixel region PIR in the detect electrode region RX. FIG. 16 shows an example of a cross-sectional view taken along line 16-16' of FIG. 15. FIG. 17 shows an example of a cross-sectional view taken along line 17-17' of FIG. 15.

A structure in FIG. 13 adds detect electrode wirings RXLI to the detect electrode regions RX of the structure in FIG. 1 of the first embodiment. In the first embodiment, touch detect electrodes RXE in detect electrode regions RX are formed of a transparent electrode made of indium-tin-oxide ITO. When a screen size upsizes, a touch panel reading malfunction might occur by a delay time due to high resistance of touch detect electrodes RXE. In this embodiment, connection detect electrode wirings RXLI made of metal prevent the touch panel from reading malfunction by being connected to the touch detect electrodes RXE in connection regions CONEC.

FIG. 14 shows plural pixel regions PIR formed in each drive electrode region TX and each detect electrode region RX and a connection state between the drive electrode wirings TXLI and the detect electrode wirings RXLI.

Touch detect electrodes RXE formed in the detect electrode region RX and the detect electrode wirings RXLI are connected in plural pixel regions PIR. Plural pixel regions PIR are arranged in a matrix in each drive electrode region TX and each detect electrode region RX. The touch detect electrodes RXE are formed in the detect electrode region RX and touch drive electrodes TXE are formed in the drive electrode region TX. In a display mode, common voltage is supplied to both the touch detect electrodes RXE and the touch drive electrodes TXE, and both the touch detect electrodes RXE and the touch drive electrodes TXE function as common electrodes.

The detect electrode wirings RXLI extend in an extending direction of data lines DL, in other words, in a vertical direction of the display portion DISP and cross the drive electrode wirings TXLI. The detect electrode wirings RXLI drawn out from the display portion DISP are bundled up in a group of each detect electrode region RXx and are connected to the detect drive circuit RXIC.

FIG. 15 is a plan view of two adjacent pixel regions PIR in a border of the drive electrode region TX and the detect electrode region RX. In FIG. 15, one pixel region belongs to a drive electrode block TX(1,2) and the other pixel region belongs to a detect electrode region RX1. The plan view in FIG. 15 adds a detect electrode wiring RXLI to the plan view in the detect electrode region RX shown in FIG. 3 of the first embodiment. The detect electrode wirings RXLI are arranged overlapping with data lines DL. A width of the detect electrode wiring RXLI is designed equal or more narrowly than a width of a data line DL, which prevents a pixel aperture ratio from decreasing.

FIG. 16 shows an example of a cross-sectional view taken along line 16-16' of FIG. 15. On the data lines DL in the detect electrode region RX, common electrodes CIT are formed through an organic protective film ORG and an upper insulating layer UPAS. The detect electrode wirings RXLI are formed directly on the common electrodes CIT. It can make a resistance for the touch detect electrodes RXE lower, which can prevent the touch panel reading malfunction due to a signal delay even when a screen size is big. The detect electrode wirings RXLI are made of the same material, and are the same size as the drive electrode wirings TXLI.

FIG. 17 shows an example of a cross-sectional view taken along line 17-17' of FIG. 15. This cross-sectional view is taken along the drive electrode wiring TXLI crossing two adjacent pixel regions PIR belonging to the drive electrode region TX and the detect electrode region RX. The drive electrode wiring TXLI in the drive electrode region TX is connected directly on the common electrodes CIT made from a first transparent conductive material ITO1. This drive electrode wiring TXLI is insulated from common electrodes CIT made from a second transparent conductive material ITO2 in this detect electrode region RX and runs across the detect electrode region RX. On the other hand, the detect electrode wirings RXLI formed in the detect electrode region RX are electrically connected directly on common electrodes CIT made from the second transparent conductive material ITO2 on the upper insulating layer UPAS. Thus, because contact holes for connections are not required, the number of steps of a manufacturing process does not increase, and a pixel aperture ratio is prevented from decreasing. In a display mode, the detect electrode wirings RXLI and the drive electrode wirings TXLI may transmit common voltage to common electrodes CIT in the detect electrode region RX and the drive electrode region TX, respectively, which reduce resistance of the common electrodes CIT. Therefore, touch detect electrodes RXE and touch drive electrodes TXE function as the common electrodes CIT.

Third Embodiment

A third embodiment in this present application is described with reference to the figures. Note that a part identical to that which is described in the first and second embodiments is given an identical reference numeral in the respective diagrams.

Figure 18:
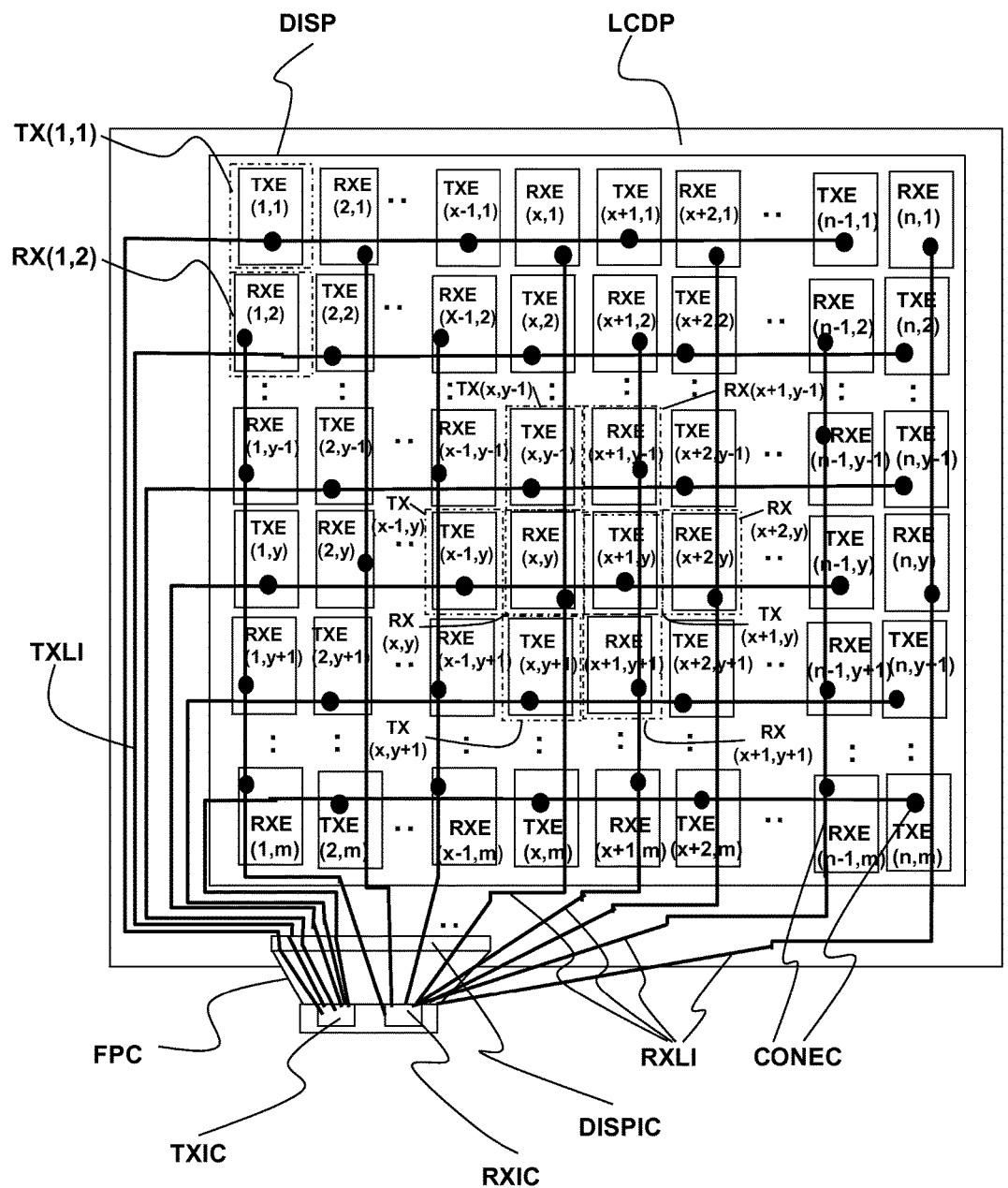
FIG. 18 is a diagram schematically illustrating a liquid crystal display device with a touch panel system inside according to a third embodiment.
Figure 19:
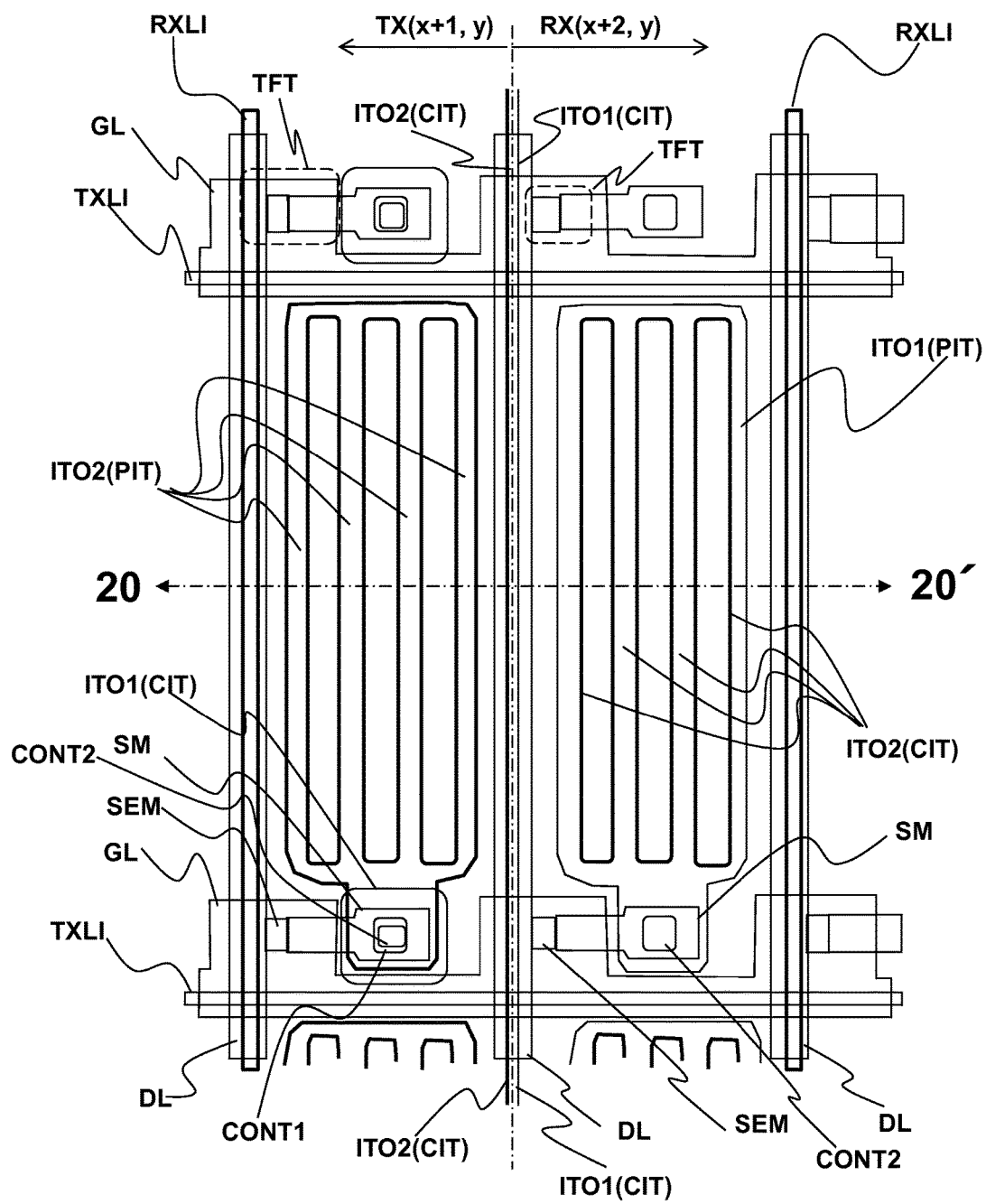
FIG. 19 is a plan view of two adjacent pixel regions included in FIG. 18.
Figure 20:
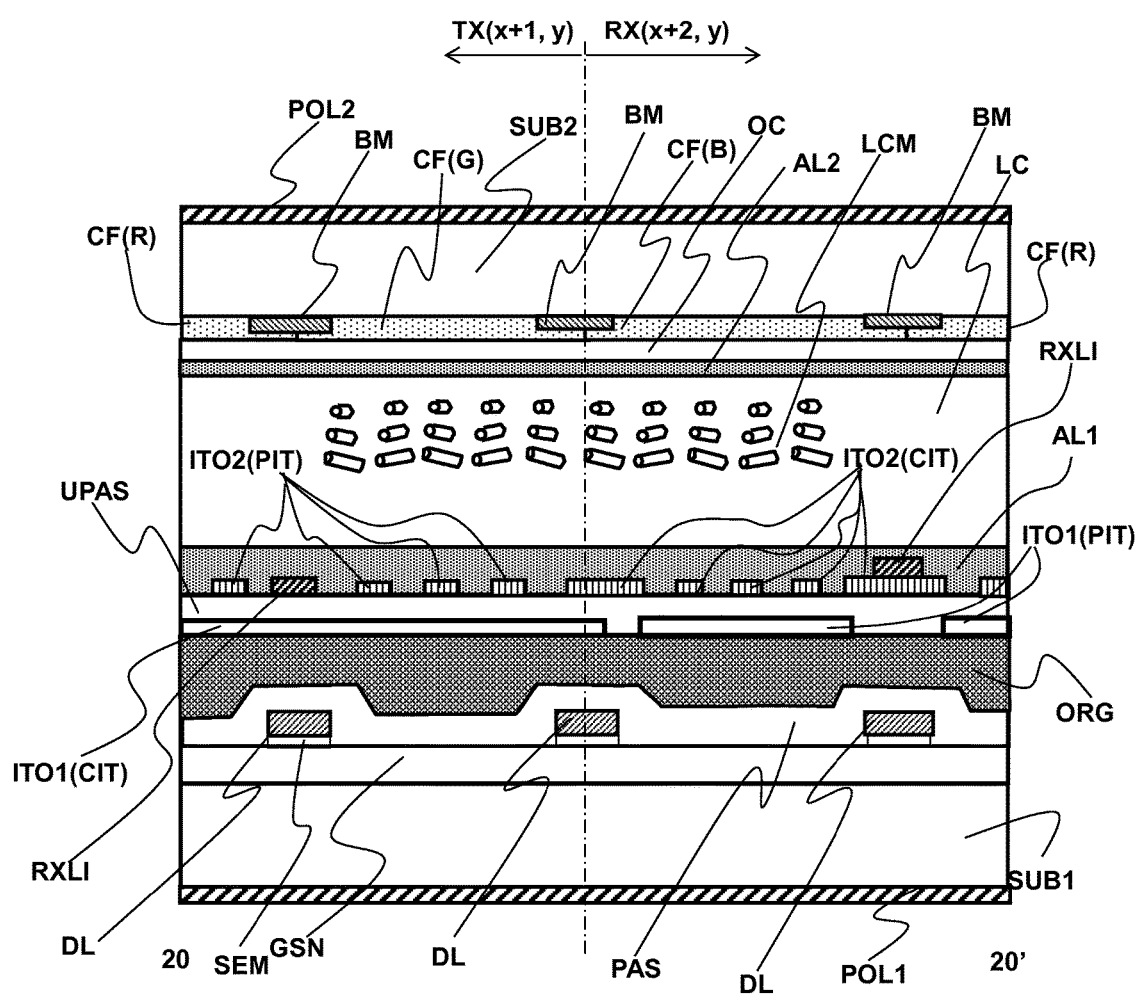
FIG. 20 shows an example of a cross-sectional view taken along line 20-20' of FIG. 19.

FIG. 18 is a diagram schematically illustrating a liquid crystal display device with a touch panel system inside LCDP according to this third embodiment. FIG. 19 is an enlarged view of two adjacent pixel regions included in FIG. 18, which belong to a drive electrode region TX and a detect electrode region RX. FIG. 20 shows an example of a cross-sectional view taken along line 20-20' of FIG. 19.

A configuration of drive electrode regions TX and detect electrode regions RX shown in FIG. 18 is different from that shown in FIG. 1 of the first embodiment in that the detect electrode regions RX extending in a vertical direction of the display portion DISP are divided into plural detect electrode blocks. As shown in FIG. 18, the drive electrode blocks and the detect electrode blocks are arranged in a matrix. For example, the detect electrode block RX(x, y) is arranged adjacent to a drive electrode block TX(x−1, y) at a right side, a drive electrode block TX(x+1, y) at a left side, a drive electrode block TX(x, y+1) at an upper side and a drive electrode block TX(x, y−1) at a lower side. In the same way, the drive electrode block TX(x+1, y) is arranged adjacent to a detect electrode block RX(x, y) at a right side, a detect electrode block RX(x+2, y) at a left side, a detect electrode block RX(x+1, y−1) at a lower side and a detect electrode block RX(x+1, y+1) at an upper side. In the first and second embodiments, each detect electrode region RXx extends in a vertical direction of the display portion DISP in a shape of stripe. In this embodiment, because the drive electrode blocks and the detect electrode blocks are arranged in a zigzag pattern, it provides a liquid crystal display with a touch panel system inside LCDP with high resolution and sensitivity for a touch panel.

Similar to the first and second embodiments, the drive electrode blocks and the detect electrode blocks function as common electrodes in a display mode. Plural pixel regions PIR are arranged in a matrix in each drive electrode block TX and each detect electrode block RX. A common electrode is formed in an entire area of each drive electrode block TX and each detect electrode block RX. A common electrode formed in the detect electrode block RX(x, y) is called a touch detect block electrode RXE (x, y). An electrode formed in the drive electrode block TX(x+1, y) is called a touch detect block electrode TXE (x+1, y).

A configuration of a plan view shown in FIG. 19 differs from a configuration of a plan view shown in FIG. 15 in that a detect electrode wiring RXLI is added to a pixel region in a drive electrode block TX (x+1, y). The detect electrode wiring RXLI in the drive electrode block TX (x+1, y) is arranged on the upper insulating layer UPAS overlapped with the data line DL. The detect electrode wiring RXLI is not connected to the touch detect electrode RXE in the drive electrode block TX (x+1, y). The detect electrode wiring RXLI is formed on a region between two pixel electrodes PIT in the two adjacent pixel regions PIR in the drive electrode block TX (x+1, y) to detour these two pixel electrodes PIT. This detect electrode wiring RXLI connects between two touch detect electrodes RXE formed in a detect electrode block RX (x+1, y−1) and a detect electrode block RX (x+1, y+1). A width of the detect electrode wiring RXLI is equal to or narrower than a width of data line DL, which prevents a pixel aperture ratio from decreasing.

FIG. 20 shows an example of a cross-sectional view taken along line 20-20' of FIG. 19. A common electrode CIT is formed to overlap with a data line DL in the detect electrode block RX (x+2, y). The detect electrode wiring RXLI is formed on the common electrode CIT. The common electrode is formed on an upper insulating layer UPAS. In a drive electrode block TX (x+1, y), a detect electrode wiring RXLI is formed in the same layer of pixel electrodes PIT and between two pixel electrodes PIT in two adjacent pixel regions PIR. The detect electrode wiring RXLI is formed directly on an upper insulating layer UPAS. A material and a size of the detect electrode wiring RXLI is similar to that in the second embodiment.

In this third embodiment, the detect electrode wiring RXLI in the detect electrode block RX (x+2, y) is formed on the touch detect electrode RXE, but these layers are changeable. In other words, on the upper insulating layer UPAS, a pattern of the detect electrode wirings RXLI is formed, and then the touch detect electrode RXE can be formed. In this case, patterns of the detect electrode wirings RXLI and the touch detect electrode RXE are formed in the same step. Therefore, a width of the detect electrode wirings RXLI is the same as a width of the touch detect electrode RXE The foregoing disclosure outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A liquid crystal display device comprising:
a first substrate;
a second substrate;
a liquid crystal layer sandwiched between the first substrate and the second substrate, and
a display portion formed on the first substrate,
the display portion including:
a plurality of data lines extending in a first direction;
a plurality of gate lines extending in a second direction which is different from the first direction; and
a plurality of pixel regions formed in a matrix, each of the pixel regions being surrounded by the data lines and the gate lines, wherein:
each of the plurality of pixel regions includes:
a thin film transistor connected to the data line;
a pixel electrode connected to the thin film transistor; and
a common electrode that is opposed to the pixel electrode,
the plurality of pixel regions in the display portion are divided into a plurality of areas, each of the plurality of areas including at least two pixel regions arranged adjacent to each other,
the plurality of areas include a plurality of first areas and a plurality of second areas,
in each of the plurality of pixel regions in each of the first areas, one of (i) the pixel electrode and (ii) the common electrode is formed closer to the liquid crystal layer than the other of (i) the pixel electrode and (ii) the common electrode,
in each of the plurality of pixel regions in each of the second areas, the other of (i) the pixel electrode and (ii) the common electrode is formed closer to the liquid crystal layer than the one of (i) the pixel electrode and (ii) the common electrode,
in each of the plurality of pixel regions in each of the first areas, the pixel electrode is formed in only a first layer, and the common electrode is formed in only a second layer, the first layer being a different layer than the second layer, and
in each of the plurality of pixel regions in each of the second areas, the pixel electrode is formed in only the second layer, and the common electrode is formed in only the first layer.

2. The liquid crystal display device of claim 1, wherein each of the plurality of first areas and second areas extends along an entire edge of the display region in the first direction, and the first areas and the second areas are alternately arranged in the second direction.

3. The liquid crystal display device of claim 2, wherein:
each of the first areas is divided into a plurality of blocks, the plurality of blocks being arranged in the first direction, each of the plurality of blocks including at least two pixel regions arranged adjacent to each other, and
the common electrodes in one of the plurality of blocks are electrically isolated from the common electrodes in an other of the plurality of blocks.

4. The liquid crystal display device of claim 3, wherein the common electrodes in each of the plurality of blocks overlap with the plurality of gate lines and the plurality of data lines formed therein.

5. The liquid crystal display device of claim 2, wherein:
at least one of the second areas is interposed between two of the first areas, and
the common electrodes formed in one of the plurality of block regions in one of the two of the first areas electrically connect to the common electrodes in an other of the two of the first areas through wirings.

6. The liquid crystal display device of claim 1, wherein the plurality of first areas and the plurality of second areas are arranged in zigzag pattern.

7. The liquid crystal display device of claim 1, wherein:
the plurality of first areas and second areas are arranged in a matrix,
at least one of the first areas is surrounded by four of the second areas,
at least one of the second areas is surrounded by four of the first areas,
the first areas and the second areas are alternately arranged in the first direction,
the first areas and the second areas are alternately arranged in the second direction,
at least one of the second areas is arranged between two of the first areas in the first direction,
at least one of the first areas is arranged between two of the second areas in the second direction,
common electrodes in the two of the first areas are electrically connected with first wirings, and
common electrodes in the two of the second areas are electrically connected with second wirings.

8. The liquid crystal display device of claim 7, wherein:
the first wirings extend in the first direction, and the second wirings extend in the second direction.

9. The liquid crystal display device of claim 7, wherein:
one of the first wirings is arranged between two pixel electrodes formed in two pixel regions in at least one of the second areas, and
one of the second wirings is arranged between two pixel electrodes formed in two pixel regions in at least one of the first areas.

10. A liquid crystal display device of claim 1, further comprising:
a touch drive circuit; and
a detect drive circuit, wherein:
the touch drive circuit outputs touch panel signals for detecting whether a touch to the common electrodes has occurred in the first areas, and
the detect drive circuit detects a voltage of the common electrodes in the second areas.

11. The liquid crystal display device of claim 1,
wherein each of the first areas is a drive electrode region, and
each of the second areas is a detect electrode region.

* * * * *